US011300752B2

(12) United States Patent
Arai et al.

(10) Patent No.: US 11,300,752 B2
(45) Date of Patent: Apr. 12, 2022

(54) MANUFACTURING METHOD OF OPTICAL COMPONENT, OPTICAL COMPONENT, LENS BARREL, OPTICAL ELEMENT HOLDER, AND OPTICAL INSTRUMENT

(71) Applicant: CANON KABUSHIKI KAISHA, Tokyo (JP)

(72) Inventors: Takashi Arai, Newport News, VA (US); Kenji Matsuda, Kawasaki (JP); Hitoshi Murao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 347 days.

(21) Appl. No.: 15/848,275

(22) Filed: Dec. 20, 2017

(65) Prior Publication Data

US 2018/0180834 A1 Jun. 28, 2018

(30) Foreign Application Priority Data

Dec. 26, 2016 (JP) .............................. JP2016-252136
May 26, 2017 (JP) .............................. JP2017-105087
Dec. 15, 2017 (JP) .............................. JP2017-241156

(51) Int. Cl.
*G02B 7/02* (2006.01)
*G02B 5/00* (2006.01)
(Continued)

(52) U.S. Cl.
CPC ........ *G02B 7/021* (2013.01); *B29C 45/14631* (2013.01); *G02B 1/11* (2013.01);
(Continued)

(58) Field of Classification Search
CPC .... G02B 27/0018; G02B 5/003; G02B 7/021; G02B 23/16; G02B 7/02; G02B 13/0045;
(Continued)

(56) References Cited

U.S. PATENT DOCUMENTS

| 4,162,120 A * | 7/1979 | Moreno | G02B 7/028 |
| | | | 359/820 |
| 4,190,325 A * | 2/1980 | Moreno | G02B 7/008 |
| | | | 359/820 |

(Continued)

FOREIGN PATENT DOCUMENTS

| JP | 11-202397 A | 7/1999 |
| JP | 3083006 U | 1/2002 |

(Continued)

OTHER PUBLICATIONS

Notice of Reasons for Refusal in Japanese Application No. 2017-241156 (dated Dec. 2021).

*Primary Examiner* — Collin X Beatty
*Assistant Examiner* — Grant A Gagnon
(74) *Attorney, Agent, or Firm* — Venable LLP

(57) ABSTRACT

An optical component includes a skeleton structural portion, and an optical characteristic portion combined with the skeleton structural portion, made of a resin material and having a predetermined optical characteristics. The skeleton structural portion defines a plurality of regularly disposed openings and the resin material of the optical characteristic portion fits into the openings such that the skeleton structural portion is combined with the optical characteristic portion through the openings.

24 Claims, 25 Drawing Sheets

(51) Int. Cl.
*G02B 1/11* (2015.01)
*B29C 45/14* (2006.01)
*G02B 7/14* (2021.01)
*B33Y 80/00* (2015.01)
*B29L 11/00* (2006.01)
*B29K 705/02* (2006.01)
*B29K 69/00* (2006.01)
*B33Y 10/00* (2015.01)
*G02B 7/10* (2021.01)

(52) U.S. Cl.
CPC .......... *G02B 5/003* (2013.01); *B29K 2069/00* (2013.01); *B29K 2705/02* (2013.01); *B29L 2011/0016* (2013.01); *B33Y 10/00* (2014.12); *B33Y 80/00* (2014.12); *G02B 7/10* (2013.01); *G02B 7/14* (2013.01)

(58) Field of Classification Search
CPC ...... G02B 27/0006; G02B 5/005; G02B 5/20; G02B 7/006; G02B 7/022; G02B 7/102; G02B 7/14; G02B 13/001; G02B 23/18; G02B 25/001; G02B 27/646; G02B 5/208; G02B 7/003; G02B 7/10; G02B 7/12; G02B 13/002; G02B 13/004; G02B 13/0055; G02B 13/0085; G02B 1/10; G02B 21/06; G02B 21/16; G02B 23/12; G02B 25/004; G02B 27/0025; G02B 27/20; G02B 27/36; G02B 7/025; G02B 7/026; G02B 7/08; G02B 13/0035; G02B 13/02; G02B 13/22; G02B 13/26; G02B 15/10; G02B 1/041; G02B 1/11; G02B 21/002; G02B 21/0088; G02B 21/08; G02B 21/26; G02B 21/361; G02B 23/10; G02B 25/005; G02B 25/007; G02B 26/008; G02B 26/0891; G02B 27/00; G02B 27/027; G02B 27/0905; G02B 27/0955; G02B 27/40; G02B 3/00; G02B 3/0012; G02B 3/0031; G02B 3/005; G02B 3/0062; G02B 5/201; G02B 5/22; G02B 5/26; G02B 5/30; G02B 6/0051; G02B 6/0075; G02B 7/008; G02B 7/023; G02B 7/04; G02B 7/105; G02B 7/16; G02B 7/1805; G02B 7/20; G02B 9/60; B29C 45/14311; B29K 2023/38; B29K 2063/00; B29K 2669/00
USPC ....................................................... 359/611
See application file for complete search history.

(56) References Cited

U.S. PATENT DOCUMENTS

| | | | |
|---|---|---|---|
| 4,805,991 | A | 2/1989 | Arai et al. |
| 4,826,424 | A | 5/1989 | Arai et al. |
| 5,264,160 | A | 11/1993 | Arai et al. |
| 5,269,867 | A | 12/1993 | Arai |
| 5,286,421 | A | 2/1994 | Arai |
| 5,290,488 | A | 3/1994 | Arai et al. |
| 5,292,457 | A | 3/1994 | Arai et al. |
| 5,953,163 | A | 9/1999 | Tanaka et al. |
| 2009/0128931 | A1* | 5/2009 | Matsumoto ........... F16C 29/041 359/823 |
| 2010/0214677 | A1* | 8/2010 | Monti ................... G02B 7/026 359/820 |
| 2015/0205099 | A1* | 7/2015 | Arai ....................... G03B 21/28 353/98 |

FOREIGN PATENT DOCUMENTS

| | | | |
|---|---|---|---|
| JP | 2003-167180 | A | 6/2003 |
| JP | 2007-056923 | A | 3/2007 |
| JP | 2012-167682 | A | 9/2012 |
| JP | 2015-093461 | A | 5/2015 |

* cited by examiner

FIG.20

| REGION | FIRST EMBODIMENT | | COMPARATIVE EXAMPLE |
|---|---|---|---|
| | METAL PORTION | RESIN PORTION | METAL PORTION |
| MATERIAL | ALUMINUM ALLOY | PC | ALUMINUM ALLOY |
| SPECIFIC WEIGHT | 2.68 | 1.20 | 2.68 |
| CUBIC CONTENT (cm^3) | 7.2 | 14.6 | 21.8 |
| WEIGHT [g] | 19.3 | 15.8 | 58.4 |
| TOTAL WEIGHT [g] | 35.1 | | 58.4 |

| REGION | SECOND EMBODIMENT | | | | FIRST COMPARATIVE EXAMPLE |
|---|---|---|---|---|---|
| | SKELETON PORTION | RECTILINEAR CAM PLATE | RESIN PORTION | | METAL PORTION |
| MATERIAL | MAGNESIUM ALLOY | ALUMINUM ALLOY | PC | | ALUMINUM ALLOY |
| SPECIFIC WEIGHT | 1.8 | 2.68 | 1.20 | | 2.68 |
| CUBIC CONTENT (cm^3) | 6.1 | 1.1 | 14.6 | | 21.8 |
| WEIGHT [g] | 11.0 | 2.9 | 15.8 | | 58.4 |
| TOTAL WEIGHT [g] | 29.7 | | | | 58.4 |

| REGION | THIRD EMBODIMENT | | | FIRST COMPARATIVE EXAMPLE |
|---|---|---|---|---|
| | SKELETON PORTION METAL BASE PORTION | RECTILINEAR CAM PLATE | RESIN PORTION | METAL PORTION |
| MATERIAL | LITHIUM MAGNESIUM ALLOY | ALUMINUM ALLOY | PC | ALUMINUM ALLOY |
| SPECIFIC WEIGHT | 1.36 | 2.68 | 1.20 | 2.68 |
| CUBIC CONTENT (cm^3) | 7.1 | 0.85 | 13.85 | 21.8 |
| WEIGHT [g] | 9.66 | 2.28 | 16.62 | 58.42 |
| TOTAL WEIGHT [g] | 28.56 | | | 58.42 |
| | }182, 183 | }181 | }51 | }1203 |

FIG.23

| REGION | FOURTH EMBODIMENT | | | FIRST COMPARATIVE EXAMPLE |
|---|---|---|---|---|
| | SKELETON PORTION METAL BASE PORTION | RECTILINEAR CAM PLATE METAL RING | RESIN PORTION | METAL PORTION |
| MATERIAL | LITHIUM MAGNESIUM ALLOY | ALUMINUM ALLOY | PC | ALUMINUM ALLOY |
| SPECIFIC WEIGHT | 1.36 | 2.68 | 1.20 | 2.68 |
| CUBIC CONTENT (cm^3) | 6.75 | 1.20 | 13.85 | 21.8 |
| WEIGHT [g] | 9.18 | 3.22 | 16.62 | 58.42 |
| TOTAL WEIGHT [g] | 29.02 | | | 58.42 |

| REGION | FIFTH EMBODIMENT | | SECOND COMPARATIVE EXAMPLE |
|---|---|---|---|
| | METAL PORTION | RESIN PORTION | METAL PORTION |
| MATERIAL | MAGNESIUM ALLOY | ABS (FOAM) | MAGNESIUM ALLOY |
| SPECIFIC WEIGHT | 1.81 | 1.08 | 1.81 |
| CUBIC CONTENT (cm^3) | 0.34 | 0.55 | 0.89 |
| WEIGHT [g] | 0.62 | 0.59 | 1.60 |
| TOTAL WEIGHT [g] | 1.21 | | 1.60 |

161 ⎬ (metal portion of fifth embodiment)
52 ⎬ (resin portion)
1204 ⎬ (second comparative example)

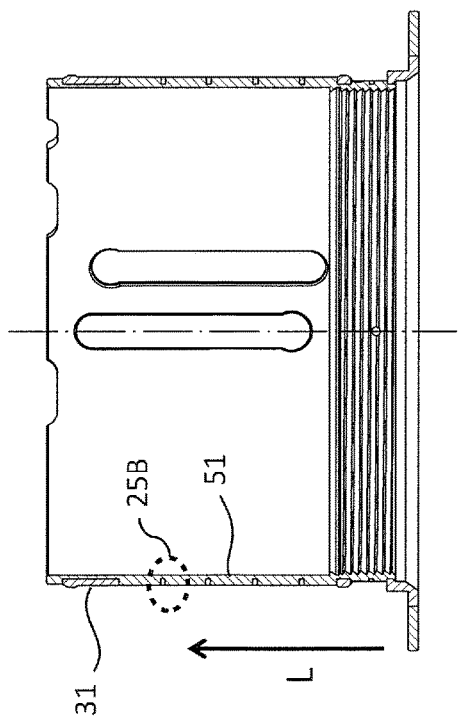
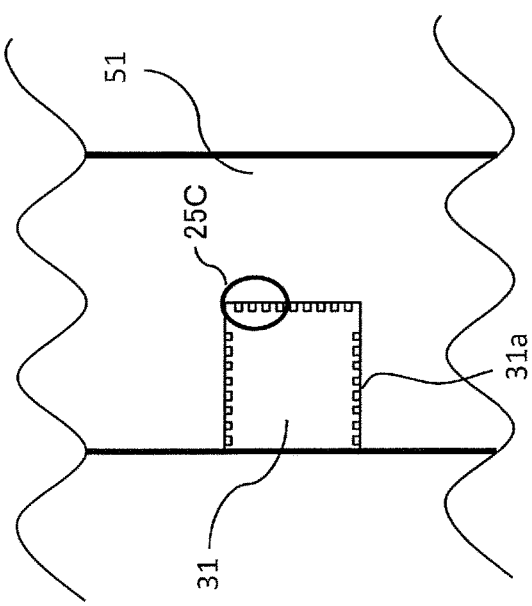
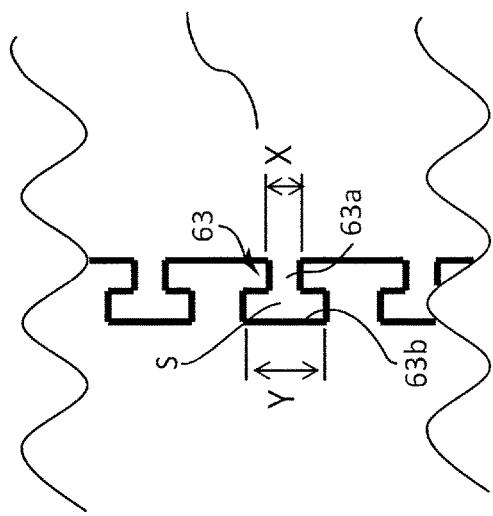
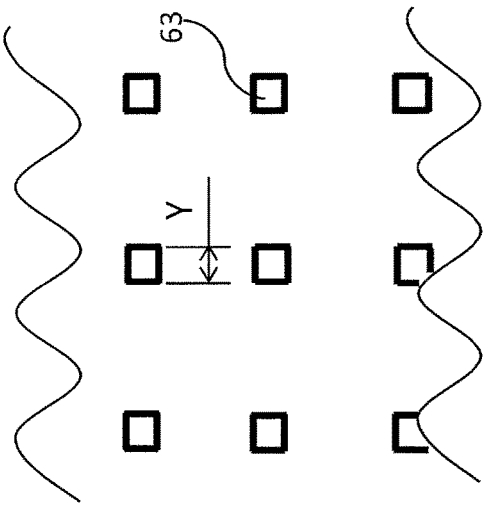

MANUFACTURING METHOD OF OPTICAL COMPONENT, OPTICAL COMPONENT, LENS BARREL, OPTICAL ELEMENT HOLDER, AND OPTICAL INSTRUMENT

BACKGROUND OF THE INVENTION

Field of the Invention

The present disclosure relates to a manufacturing method of an optical component, the optical component, a lens barrel as the optical component, an optical element holder, and an optical instrument.

Description of the Related Art

Hitherto, a demand for lightening or downsizing a lens barrel part of an optical product, such as a large zoom lens having a long focal distance, used in an optical instrument (e.g., a camera) is growing to improve their portability and mobility in photographing. Therefore, resinification and thinning of components composing the lens barrel portion configured to hold lenses are underway.

Hitherto, there is known a method for changing a whole or a part of metallic components to resin which has less specific weight to downsize or lighten weight of the components composing various industrial products. In such a case, it is also considered to thin a size or a thickness in particular of a metallic or resin part in the same time. For instance, Japanese patent application laid-open No. 2007-056923 discloses a resin-made gear into which a metallic bushing is inserted and by which lightening and reduction of noise can be realized while keeping strength as the gear.

As for an optical lens barrel, Japanese patent application laid-open No. Hei. 11-202397 discloses a watertight structure of a water-proof lens barrel built by forming an outer barrel by a metallic lens barrel by pressing aluminum or the like, an inner lens barrel by a resin material, and by fixing a sealing member by the outer and inner barrels by using adhesives or screws. Japanese patent application laid-open No. 2003-167180 also discloses a structure in which a metallic member is integrated with a resin member by an integral molding by taking rigidity, strength and lightening of the lens barrel into consideration. A mechanical portion configured to move the lens barrel is formed of resin in Japanese patent application laid-open No. 2003-167180.

Here, a total weight of a zoom lens carrying a long focus length and large-aperture lens exceeding 500 mm to 1000 mm for example often reaches in an order of Kg. Such optical product is available as an interchangeable lens of a mirror-type or mirrorless single lens reflex camera. It is preferable to be able construct such optical product as light as possible to improve portability and to permit it to be handled easily. However, because an optical device and mechanical parts themselves are large and heavy in the optical product of this type such as the interchangeable lens, it is often difficult to replace a housing part of the lens barrel portion simply from metal to resin from aspects of strength and wear resistance of slide portions.

Still further, while a structure of forming V-shaped grooves called as light shielding lines on an inner surface of the housing part at a region where ghost and flare is generated due to stray light is adopted in general, there is a case when it is difficult to thin the resin part due to such groove working. Still further, the optical product such as the lens barrel requires a strict light shielding property between its housing and a space around an internal optical axis to prevent disturbance light from being irradiated within the lens. Accordingly, the housing part of the lens barrel is required to have the necessary light shielding property. Therefore, it is practically impossible to adopt a structure including openings that communicate in and outside such as punching for the optical component composing the lens barrel.

SUMMARY OF THE INVENTION

According to a first aspect of the present disclosure, a manufacturing method of an optical component includes providing a skeleton structural portion of the optical component, and combining an optical characteristic portion having predetermined optical characteristics with the skeleton structural portion by insert-molding a resin material.

According to a second aspect of the present disclosure, an optical component includes a skeleton structural portion, and an optical characteristic portion combined with the skeleton structural portion, made of a resin material and having a predetermined optical characteristics. The skeleton structural portion defines a plurality of regularly disposed openings and the resin material of the optical characteristic portion fits into the openings such that the skeleton structural portion is combined with the optical characteristic portion through the openings.

According to a third aspect of the present disclosure, a lens barrel includes an optical element, a skeleton structural portion defining a plurality of regularly disposed openings, and an optical characteristic portion formed of a resin material having a light shielding property and combined with the skeleton structural portion through the openings. The optical element is supported by a structural body formed by the skeleton structural portion combined within the optical characteristic portion.

According to a fourth aspect of the present disclosure, an optical element holder includes a skeleton structural portion defining a plurality of regularly partitioned openings, and an optical characteristic portion formed of a resin material having a light shielding property and combined with the skeleton structural portion through the openings. An optical element is supported by a structural body formed of the skeleton structural portion combined within the optical characteristic portion.

Further features of the present invention will become apparent from the following description of exemplary embodiments with reference to the attached drawings.

BRIEF DESCRIPTION OF THE DRAWINGS

FIG. 20 is a table indicating a material, specific weight, cubic content and weight of each optical component fabricated according to the first embodiment and to a comparative example.

FIG. 21 is a table indicating a material, specific weight, cubic content and weight of each optical component fabricated according to the second embodiment and to a first comparative example.

FIG. 22 is a table indicating a material, specific weight, cubic content and weight of each optical component fabricated according to the third embodiment and to the first comparative example.

FIG. 23 is a table indicating a material, specific weight, cubic content and weight of each optical component fabricated according to the fourth embodiment and to the first comparative example.

FIG. 24 is a table indicating a material, specific weight, cubic content and weight of each optical component fabricated according to the fifth embodiment and to a second comparative example.

FIG. 25A illustrates a section view of the guide barrel 15 as the housing component of the lens barrel.

FIG. 25B illustrates an enlarged section view of a part of FIG. 24A.

FIG. 25C illustrates an enlarged section view of a part of FIG. 24B.

FIG. 25D illustrates a right side view of FIG. 25C.

DESCRIPTION OF THE EMBODIMENTS

Figure 1:
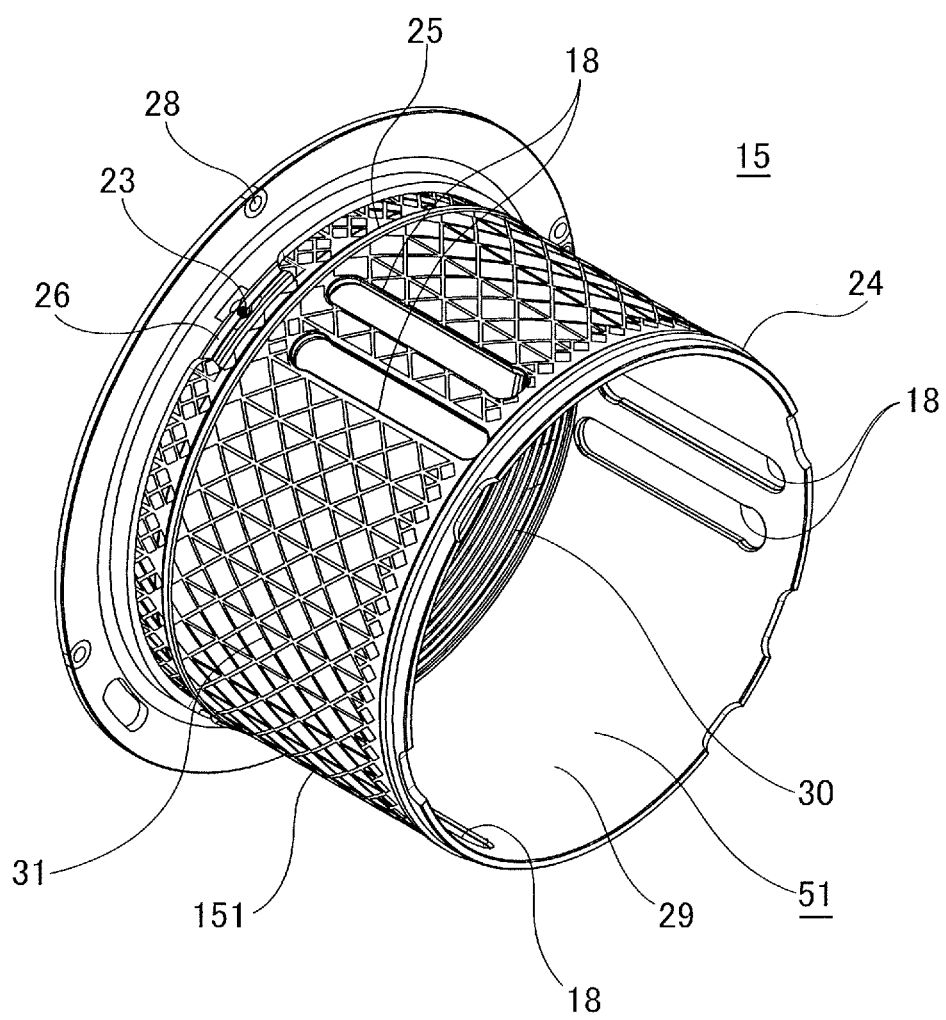
FIG. 1 is a perspective view of an appearance of a housing component of a lens barrel of a first embodiment of the present disclosure.

Embodiments for carrying out the present disclosure will be described below with reference to the drawings. It is noted that configurations illustrated below are merely exemplary configurations to the end, and a person skilled in the art may appropriately modify detailed configurations within a scope not departing from the gist of the present disclosure. Numerical values adopted in the embodiments are also reference values and do not limit the present disclosure.

The following embodiments illustrate optical components, and their manufacturing methods, each including a skeleton structural portion and an optical characteristic portion combined with the skeleton structural portion, composed of a resin material and having predetermined optical characteristics. The skeleton structural portion is composed of a material, e.g., a metal material in the present embodiment, different from the resin material and having higher rigidity and wear resistance than those of the resin material used in the optical characteristic portion. The optical component is exemplified below by a lens barrel component in first through fourth embodiments and by a mirror holder serving as an optical element holder in a fifth embodiment.

The skeleton structural portion of the optical component is formed by a 3D printer or molding, e.g., by die casting, or by machining after molding. The skeleton structural portion mainly keeps rigidity or strength of the optical component. A part of the skeleton structural portion can be also constructed as a part used as a portion abutting or coupling with another component.

Meanwhile, the optical characteristic portion is formed by insert-molding the resin material to the skeleton structural portion. While the optical characteristic portion formed of the resin material composes a part of functions for keeping the rigidity or strength of the optical component, it mainly functions as a part for giving optical characteristics such as a light shielding property and antireflection characteristics. Among them, the light shielding property is given to the optical characteristic portion by mainly using a black non-transparent material for example. The antireflection characteristics is given by forming a mat surface and light shielding lines or light shielding grooves at necessary regions by simultaneous machining or post-processing during the insert molding.

A plurality of regularly disposed openings is provided in the skeleton structural portion by the 3D printer or molding or post-processing thereafter. The skeleton structural portion and the optical characteristic portion are firmly combined through the openings by implementing the insert molding such that the resin material of the optical characteristic portion enters the openings.

First Embodiment

In a first embodiment, the lens barrel component, i.e., the lens barrel housing component, will be exemplified as the optical component described above. The skeleton structural portion of the lens barrel housing component of the present embodiment having areas which require rigidity including a screw fastening portion is fabricated by a material having higher strength such as metal in order to reduce weight while keeping strength. Still further, a portion which is coupled or slides with another component and which requires wear resistance is preferably fabricated by a material having high wear resistance similarly to the skeleton structural portion and integrally with the skeleton structural portion. This skeleton structural portion can be formed by the 3D printer or by casting or the post-processing thereafter in a first step for manufacturing the optical component of the present embodiment.

Meanwhile, the optical characteristic portion of the lens barrel component is composed of a black resin material that does not transmit light and having a specific weight lower than that of the skeleton structural portion in order to shield light, to have antireflection characteristics and to reduce the weight. In a second step for manufacturing the optical component of the present embodiment, this optical characteristic portion is formed by disposing the abovementioned skeleton structural portion within a molding and by implementing insert molding of injecting or of casting the resin material into the molding.

Specifically, the lens barrel component of the present embodiment is an optical element within the lens barrel or an inner barrel of a focus unit an inner barrel of a focus unit that movably supports a focusing lens, and the skeleton structural portion is insert-molded such that the skeleton structural portion is embedded within the optical characteristic portion made of the resin to prevent reflection on an inner surface of the skeleton structural portion. Still further, matting is implemented by mat processing preferably on an inner surface of the resin-made optical characteristic portion by simultaneous molding. Thus, an antireflection surface is formed to prevent light from reflecting on the inner surface and ghost and flare from being generated in the lens barrel component of the present embodiment. This matting form can be implemented inexpensively by forming on the molding and by transferring it to the optical component. The antireflection surface may be also formed by the post-processing after insert molding, or a post-processing step such as coating can be implemented for a purpose of enhancing the mat effect. It is noted that anti-reflection patterns in which V-shaped grooves are periodically made on the circumference, i.e., so-called light shielding lines, can be used as the antireflection surface in the lens barrel component of the present embodiment. The light shielding lines can be made by the simultaneous molding of the insert molding or by the post-processing thereafter. However, the mat process described above is considered to permit to thin a thickness of the resin more than the light shielding lines. Thus, there is a possibility that the thickness of the lens barrel component can be thinned and can be lightened more.

Figure 2:
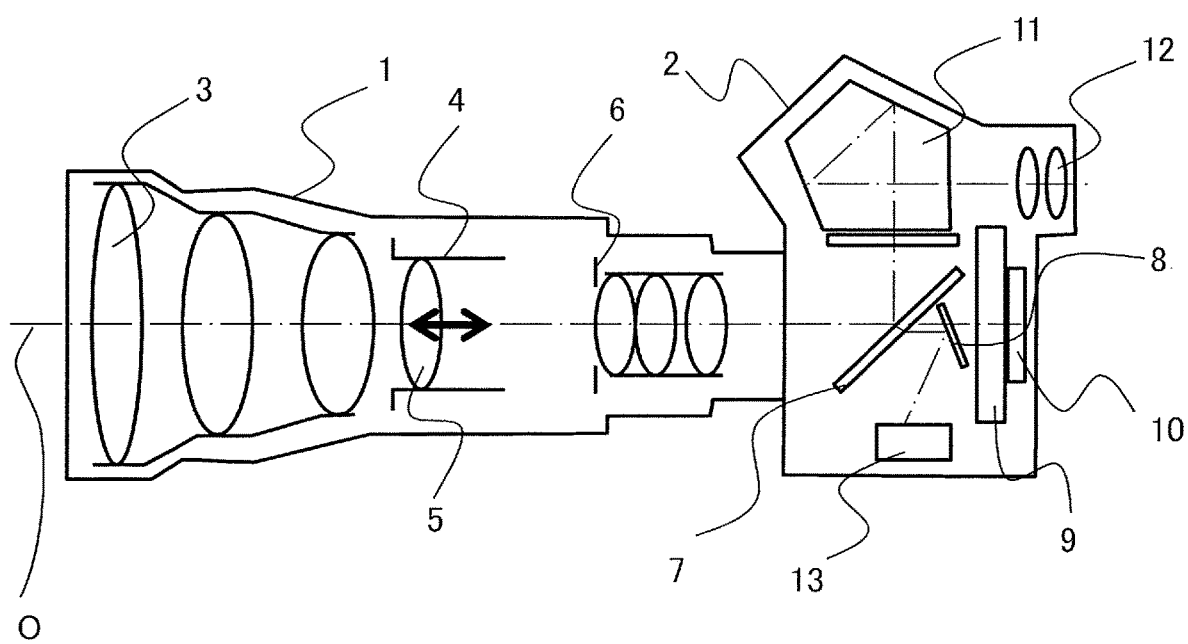
FIG. 2 illustrates a configuration of a camera of the first embodiment.

FIG. 2 illustrates a configuration of a single-lens reflex digital camera as an optical instrument to which the lens barrel component of the present embodiment is applicable. In FIG. 2, a camera body 2 is connected with a photographing lens unit 1. Light from an object is photographed through optical lenses such as a lens 3 included in the photographing lens unit 1. Before photographing, a photographing image is reflected by a main mirror 7, transmits through a prism 11, and is then imaged to a photographer through a finder lens 12. The main mirror 7 is a half-mirror, and the light transmitted through the main mirror 7 is reflected by a sub-mirror 8 in a direction of an AF (auto-focus) unit 13. This reflected beam is used for focusing for example.

During photographing, the main mirror 7 and the sub-mirror 8 are moved out of an optical path through a driving mechanism not illustrated, a shutter 9 is opened and the photographing image inputted from the photographing lens unit 1 is imaged on an image pickup element 10. A diaphragm 6 is configured such that brightness and a depth of a focal point can be changed during photographing by changing an opening area thereof. It is noted that the lens barrel component of the present embodiment can be embodied by a similar configuration as described later even if the image pickup element 10 of the single-lens reflex camera is replaced with a silver halide film. Still further, while the photographing lens unit 1 may be fixedly attached to the camera body 2, the photographing lens unit is often configured to be an interchangeable lens detachable from the camera body 2 in the optical instrument of this sort.

Figure 3A:
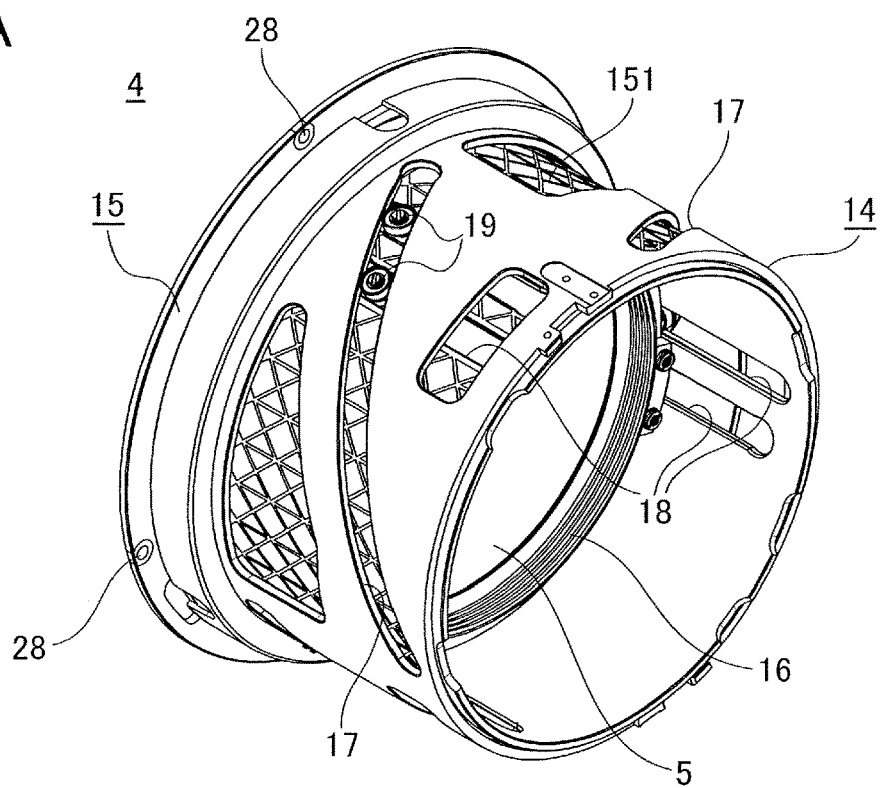
FIG. 3A is a perspective view of an appearance of the housing component of the lens barrel of the first embodiment, showing a structure of a focus unit in particular.
Figure 3B:
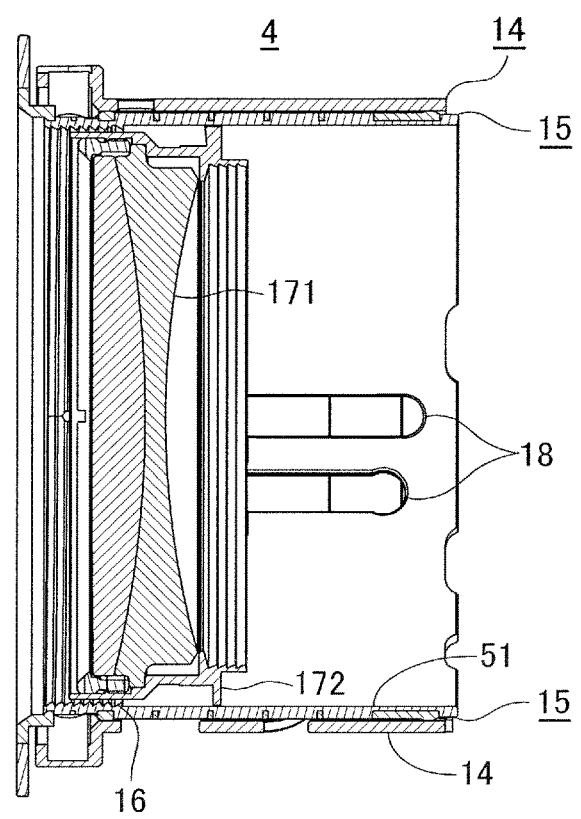
FIG. 3B is a section view illustrating a structure of the focus unit including a focus lens.
Figure 4:
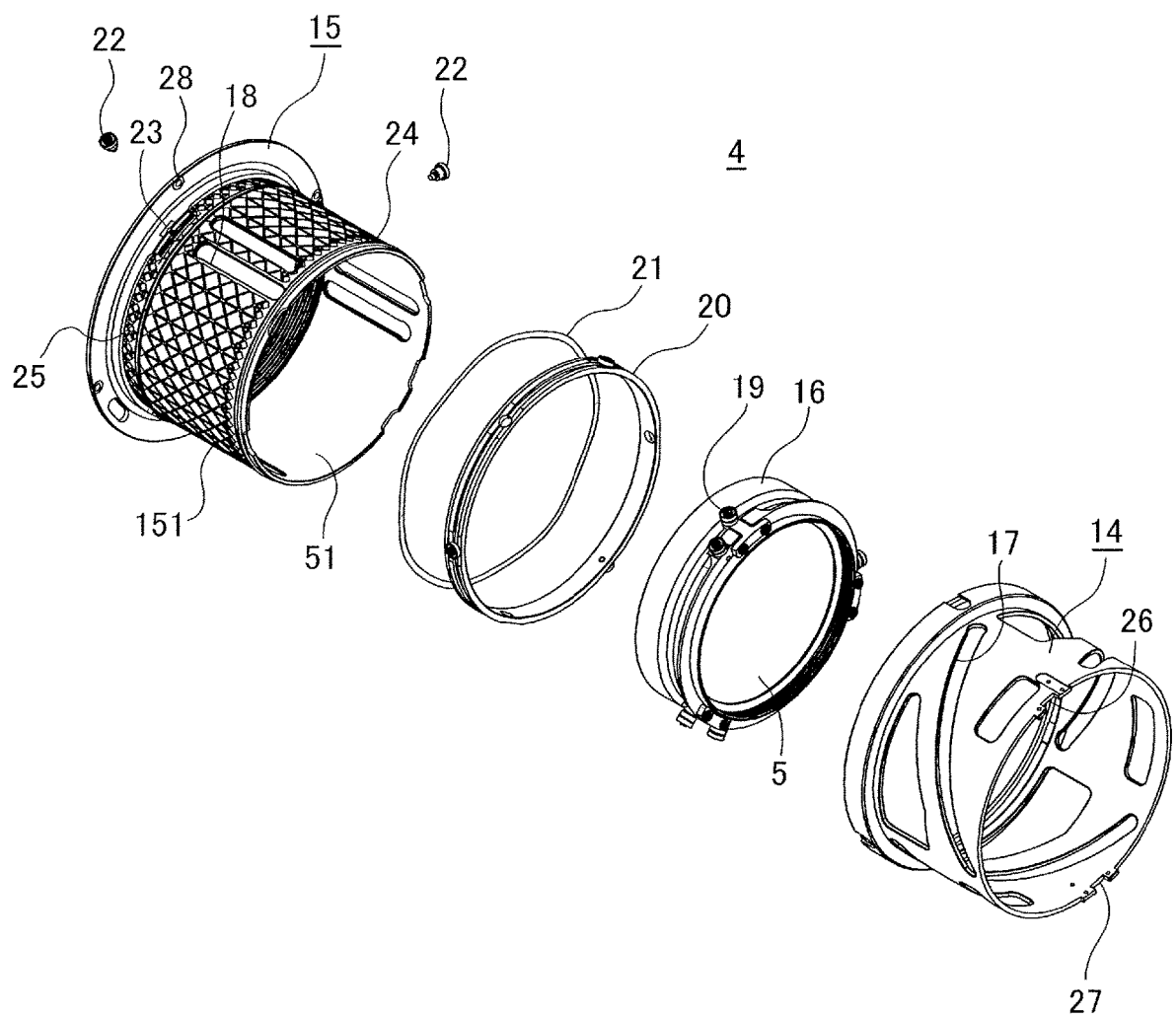
FIG. 4 is an exploded perspective view illustrating the structure of the focus unit in FIG. 3A.

The photographing lens unit 1 is configured to be able to adjust a focusing condition by variably moving a position of a focus lens 5 within the focus unit 4 in a direction of the optical axis O. It is noted that the lens barrel component of the present embodiment composes the focus unit 4 that adjusts this focal length, the same configuration of the lens barrel component is also applicable to a zoom unit configured to variably adjust magnification. FIGS. 3A and 3B and FIG. 4 illustrate exemplary a configuration of the focus unit 4 of the present embodiment.

As illustrated in FIGS. 3A and 3B and FIG. 4, the focus unit 4 of the present embodiment includes a cam barrel 14 serving as an outer barrel and a guide barrel 15 serving as an inner barrel that corresponds to the lens barrel component of the present embodiment. The cam barrel and the guide barrel 15 include inclined cams and rectilinear cams and are configured such that the focus lens 5 can be moved forward/backward on the optical axis within the unit. The cam barrel 14 is coupled with a focus ring or the like and not illustrated of the photographing lens unit 1 that can be turned by the photographer. This arrangement makes it possible for the photographer to operate the focus ring and to adjust focus while observing a focusing condition through the finder lens 12 as illustrated in FIG. 2.

The cam barrel 14 is provided with the inclined cams 17 at intervals of 120°. The guide barrel 15 is also provided with the rectilinear cams 18 at intervals of 120°. The focus lens 5 is held in a focus lens holder 16. Bearings 19 are mounted to the focus lens holder 16 at intervals of 120°.

The bearings 19 engage with the inclined cams 17 and the rectilinear cams 18 and their positions are fixed. The inner surface of the cam barrel 14 engages with sliding surfaces 24 and 25 (see FIG. 5) of the guide barrel 15. A bearing 22 is screwed into a screw fastening hole 23 of the guide barrel 15 and is also engaged with the cam barrel 14.

A charge barrel 20 pushes the cam barrel 14 in the optical axis direction by a washer spring 21 which is in contact with the guide barrel 15. That is, the position in the optical axis direction of the focus lens 5 is kept in a condition in which the cam barrel 14 is urged in an obliquely lower right direction in FIG. 3A by the bearing and the charge barrel 20. The guide barrel 15 is screwed with a fixed lens barrel component disposed out of the focus unit 4 such as an exterior portion by a screw fastening portion 28.

Meanwhile, the cam barrel 14 is operationally turned by being engaged, at key ways 26 and 27, with a focus ring serving as a focus key component that is rotationally driven centering on the optical axis. The bearings 19 engaged with the rectilinear cams 18 move in a direction of the optical axis along the inclined cams 17 as the cam barrel 14 turns. Thereby, the focus lens 5 is moved in the optical axis direction and thus the focus is adjusted.

As for the guide barrel 15 that corresponds to the lens barrel component of the present embodiment, an optical characteristic portion 51 having the light shielding property and the antireflection characteristics as described above is fabricated by insert-molding the resin material of to a metal-made cylindrical skeleton structural portion 31.

Here, the guide barrel 15 that corresponds to the lens barrel component of the present embodiment will be described in detail. The guide barrel 15 is what the optical characteristic portion 51 formed of the resin material is insert-molded to the skeleton structural portion 31 illustrated in FIGS. 5 and 6. FIG. 1 illustrates its completed condition.

Figure 5:
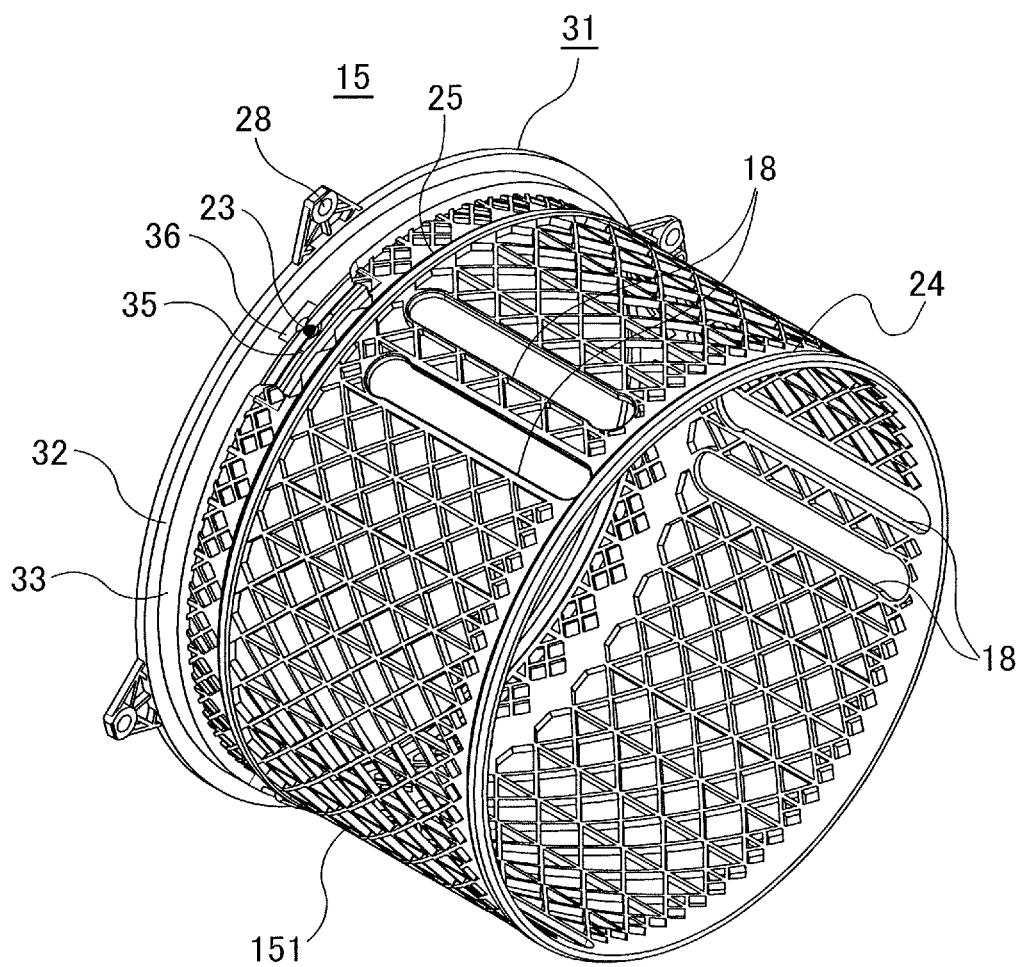
FIG. 5 is a perspective view of an appearance of the housing component, in particular of a metal part of the guide barrel, of the lens barrel of the first embodiment.
Figure 6:
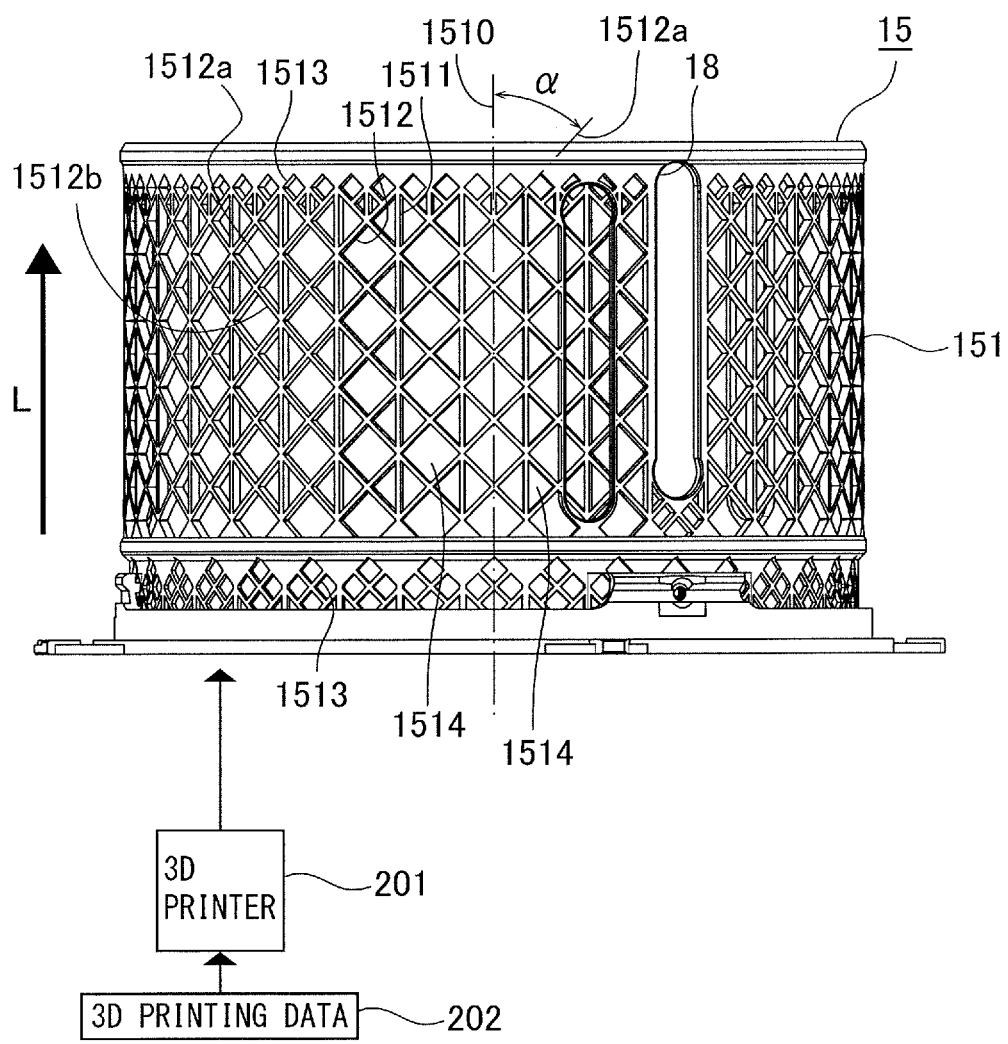
FIG. 6 illustrates a method for manufacturing the housing component, in particular of the metal part of the guide barrel, of the lens barrel of the first embodiment by using a 3D printer.

As illustrated in FIGS. 5 and 6, the skeleton structural portion 31 has a skeleton structure formed of a lattice 151 configured so as to keep the rigidity and strength of the guide barrel 15 on its cylindrical surface. The lattice 151 includes a plurality of grids 1512 made of the metal material, disposed so as to incline with respect to a straight line in parallel with an axial center line 1510 of the cylindrical surface formed by the skeleton structural portion 31 and which is normally coaxial with the optical axis O of the focus lens 5, and inclined so as to diagonally intersect with each other. More specifically, the grid-like shape is formed of the plurality of grids 1512 arrayed such that a grid 1512*a* intersects with a grid 1512*b*. The grid 1512*a* is inclined toward one direction in a circumferential direction of the guide barrel 15 with respect to the straight line in parallel with the axial center line, and the grip 1512*b* is inclined toward another direction in the circumferential direction of the guide barrel 15 with respect to the straight line in parallel with the axial center line. Still further, according to the present embodiment, the lattice 151 includes a grid 1511 extending in parallel with the axial center line of the cylindrical surface formed by the skeleton structural portion 31 which is normally coaxial with the optical axis O of the focus lens 5. The structure of such lattice 151 can give the guide barrel 15 with the rigidity against a compression acting in a radial direction or along the direction in parallel with the axial center line which is normally coaxial with the optical axis O of the focus lens 5 and related with an external force in a twist direction applied through the cam groove of the rectilinear cam 18. Still further, as illustrated in FIG. 6, a large number of openings 1513 each having a quadrangle shape matched with the direction of the inclined grids 1512 at both end portions of the guide barrel 15.

Regions partitioned by the grids 1511 and 1512 described above become triangular or quadrangular openings 1514, respectively, regularly partitioned and disposed by these grids. Almost all of the cylindrical structure of the skeleton structural portion 31 is lightened by these regularly disposed openings 1514, so that the skeleton structural portion 31 is lightened considerably.

The skeleton structural portion 31 also includes the following regions. These correspond to the rectilinear cam 18 configured to engage with the bearing 19 and the sliding surfaces 24 and 25 configured to engage with the cam barrel 14. The skeleton structural portion 31 further includes the screw fastening hole 23 into which the bearing is screwed and bearing surfaces 35 and 36, a bearing surface and a recess of the screw fastening portion 28 for connecting with a lens barrel component disposed out of the focus unit 4, an abutment surface 32 abutting with a washer spring 21, a sliding surface 33 configured to engage with a charge barrel 20, and others.

The skeleton structural portion 31 having a shape of such a degree of complexity as illustrated in FIG. 6 can be fabricated suitably by using a 3D printer 201 for example. In a case where the skeleton structural portion 31 is shaped by the 3D printer 201 for example, shaping is started from a back surface of the abutment surface 32, and lamination shaping is repeated along a lamination direction L as indicated in FIG. 6. The lamination direction L coincides with the direction in parallel with the axial center line of the skeleton structural portion 31 which is normally coaxial with the optical axis of the focus lens 5. At the time of shaping, 3D printing data 202 for shaping the skeleton structural portion 31 is supplied in advance. The 3D printing data 202 is 3D CAD data or the like of the skeleton structural portion 31 for example. In such a case, the 3D printer 201 uses the 3D CAD data by decomposing the data into layers, i.e., slices, for laminating and shaping in the lamination direction L. The layer, i.e., the slice, data may be directly supplied to the 3D printer 201 as the 3D printing data 202. It is noted that in a case of supplying the 3D printing data 202 to the 3D printer 201 from a server or a host unit not illustrated, the 3D printing data 202 may be transmitted through a network communication. Or, it is also possible to store the 3D printing data 202 to a computer readable recording medium such as various optical disks and flush memory devices. In such a case, the computer readable recording medium composes a recording medium of the present disclosure.

In the example illustrated in FIG. 6, an angle between the lamination direction L, i.e., the direction in parallel with the axial center line of the skeleton structural portion 31 which is normally coaxial with the optical axis of the focus lens 5, and the inclined grid 1512 described above, i.e., the inclination angle of the grid 1512 is approximately 45°. This arrangement makes it possible to keep the rigidity favorably to any external force in each direction described above. It is noted that the inclination angle α of the inclined grid 1512 is desirable to be less than around 50°. If the inclination angle α of the grid 1512 exceeds around 50° and approaches to a lying attitude in a horizontal direction, there is a possibility that it becomes difficult to implement the 3D shaping stably. Meanwhile, it becomes possible to shape the skeleton structural portion 31 stably by the 3D printer by setting the inclination angle α of the grid 1512 to be less than 50° or to be around 45° as illustrated in FIG. 6 in the present embodiment.

Figure 7A:
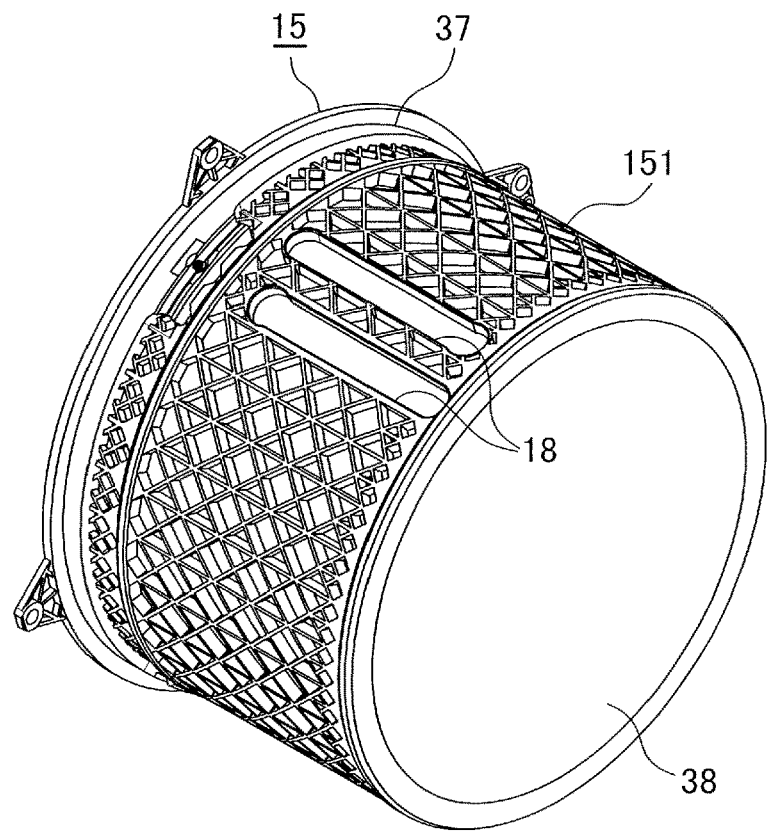
FIG. 7A is a perspective view illustrating a skeleton structural body formed by casting before post-processing.
Figure 7B:
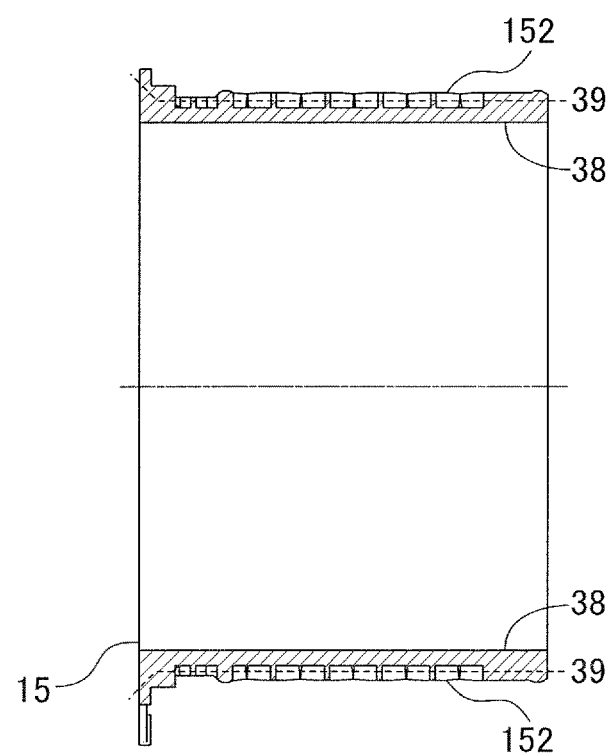
FIG. 7B is a section view of the skeleton structural body illustrated in FIG. 7A.

It is noted that besides shaping by the 3D printer, the skeleton structural portion 31 may be fabricated by casting or by post-processing as illustrated in FIGS. 7A and 7B. In such a case, a metal cast component 37 having a flow margin 38 is fabricated in a bore diameter portion as illustrated in FIG. 7A. In a condition right after casting, the region of the openings composed of the lattice 151 having the shape as described above do not penetrate to an inner surface because the flow margin 38 exists as indicated by slash lines in FIG. 7B. After the casting, the flow margin 38 is removed by machining for example along a removal line 39 to let the openings of the lattice 151 penetrate and to obtain the skeleton structural portion 31 as illustrated in a section view of FIG. 7B.

FIG. 1 illustrates the guide barrel 15 fabricated by insert-molding the resin-made optical characteristic portion 51 to the skeleton structural portion 31 fabricated as described above.

A diameter of an outer surface of the guide barrel 15 is equalized with an outer diameter of the skeleton portion of the skeleton structural portion 31 to simplify a shape of the molding and to reduce and to lighten a cubic content of the resin portion. Specifically, after the insert molding, the guide barrel 15 is appeared to be constructed such that the skeleton structural portion is exposed on an outer circumferential surface of the resin-made optical characteristic portion 51. For instance, the molding for the insert molding is configured such that the resin material of the optical characteristic portion 51 enters and fits into the openings of the lattice 151 to a depth in flush with the outer circumference of the skeleton structural portion 31 for example. Besides that, the following regions of the skeleton structural portion 31 or the regions abutting or sliding with other members in particular are configured such that metallic regions of the skeleton structural portion 31 are exposed to the outer surface of the guide barrel 15 in order to assure abutting and sliding functions. The abutting and sliding regions of the skeleton structural portion 31 which are exposed to the outer surface of the guide barrel 15 include the rectilinear cam 18 engaged with the bearing 19, the sliding surfaces 24 and 25 engaging with the cam barrel 14, the screw fastening hole 23 screwed with the bearing 22 and the bearing surfaces 35 and 36. The abutting and sliding regions of the skeleton structural portion 31 which are exposed to the outer surface of the guide barrel 15 also include the bearing surface and the recess of the screw fastening portion 28 connected with a lens barrel component disposed out of the focus unit 4, the abutment surface 32 abutting with the washer spring 21, and the sliding surface 24 engaging with the charge barrel 20.

Meanwhile, the optical characteristic portion 51 is insert-molded such that the metallic skeleton structural portion 31 is not exposed to assure the light shielding property on the cylindrical inner surface 29 of the guide barrel 15. Preferably, the inner surface of the guide barrel 15 is formed to be an antireflection surface by mat processing in order to prevent ghost or flare from being generated due to reflection of unwanted light. The antireflection surface 29 may be formed by forming the optical characteristic portion 51 on the molding for insert-molding and by transferring it to the optical characteristic portion 51. Or, the antireflection surface 29 may be formed by the appropriate post-processing or coating as described above.

Figure 8A:
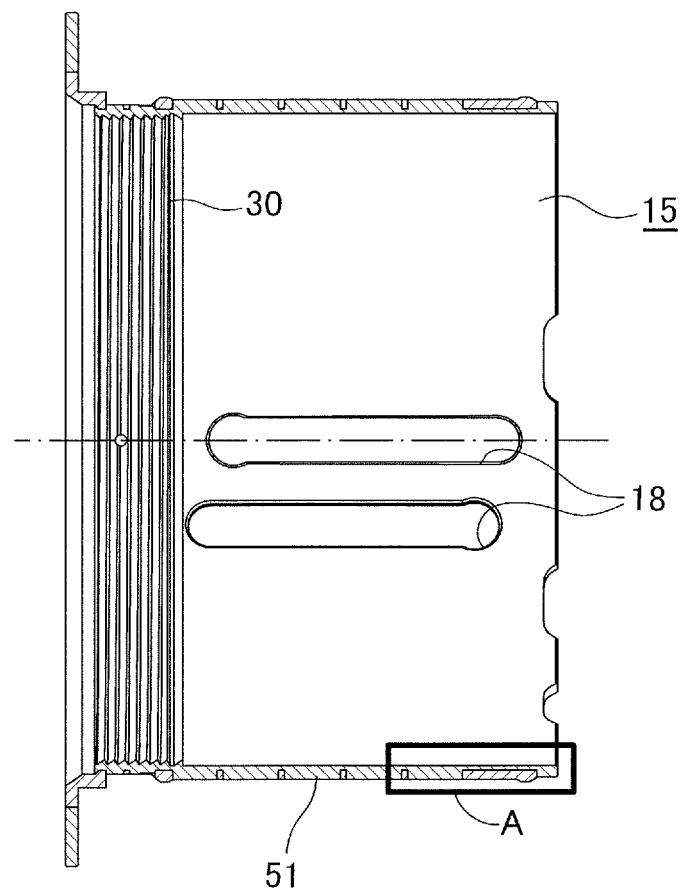
FIG. 8A is a section view illustrating the housing component of the lens barrel of the first embodiment.
Figure 8B:
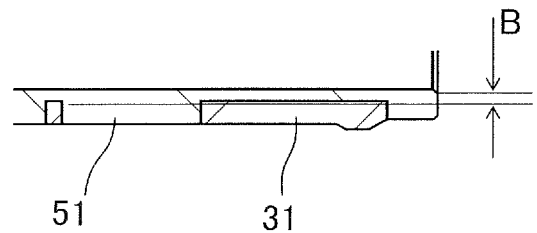
FIG. 8B is an enlarged section view illustrating a part of the housing component illustrated in FIG. 8A.

Still further, a region of so-called light shielding lines 30 may be formed at a necessary region of a part of the inner surface of the guide barrel 15 or at the resin-made optical characteristic portion 51 in particular as illustrated in FIG. 8A. That is, a plurality of circumferential V-shaped grooves is arrayed in the direction of the axial center line 1510 in the region of the light shielding lines 30. Here, the skeleton structural portion 31 in the guide barrel 15 of the present embodiment requires a flow margin B for insert-molding the resin-made optical characteristic portion 51 as illustrated in a section view of FIG. 8B. While a thickness of the guide barrel 15 increases by the flow margin B in the case of the mat processed antireflection surface 29 described above, the mat processing is considered to be desirable in order to thin and lighten the guide barrel 15 because a thickness of the light shielding lines is added further to the thickness of the flow margin B in the case of forming the light shielding lines 30.

The metallic skeleton structural portion 31 may be formed of an aluminum alloy having a specific weight of 2.68, and the resin-made optical characteristic portion 51 may be formed of PC (polycarbonate) having a specific weight of 1.2 in the optical component and the lens barrel component of the first embodiment as indicated in a table FIG. 20. In this case, as indicated in FIG. 20, a cubic content of the skeleton structural portion 31, i.e., the metal portion, of the first embodiment is 7.2 cm^3 ('^' denotes power) and its weight is 19.3 g. A cubic content of the optical characteristic portion 51 (the resin portion) is 14.6 cm^3 and its weight is 15.8 g. Accordingly, a total weight in which the metal portion is added with the resin portion is 35.1 g. Meanwhile, a comparative example 1203 is a case in which portions having the equal cubic content with and corresponding to the skeleton structural portion 31, i.e., the metal portion, and the optical characteristic portion 51, i.e., the resin portion, on a left side of the table in FIG. 20 is fabricated only by the aluminum alloy. A total weight of the comparative example 1203 is 58.4 g, indicating that the configuration of the first embodiment achieves lightening of about 40% in terms of the total weight.

It is noted a manufacturing method that realizes a required precision can be adopted by implementing a secondary process, i.e., the post-processing, by machining after insert molding for regions for which it is hard to assure the precision by the 3D printer, casting or the insert molding in manufacturing the guide barrel 15. In such a case, it is desirable to add an extra thickness to the regions to which the secondary processing, i.e., the post-processing, is to be implemented in implementing the 3D printer, casting or the insert molding.

The structure in which the metallic skeleton structural portion 31 is exposed out of the resin-made optical characteristic portion 51 on the outer periphery of the guide barrel 15 has been exemplified above. However, there is a possibility that light reflects at the region of the skeleton structural portion 31 exposed out of the optical characteristic portion 51, thus generating ghost and flare. In such a case, the exposed region of the skeleton structural portion 31 may be colored by coating or by an alumite treatment to apply antireflection characteristics to the exposed portion of the skeleton structural portion 31.

Still further, the skeleton structural portion 31 having the openings as the lightened portions partitioned by the straight grid structure and regularly disposed has been described above. However, a shape obtained by a phase optimization analysis or the like may be adopted as the shape of the openings as the lightening portions regularly disposed to achieve the required lightening. As phase optimization software of this sort, OptiStruct (product name) of Altair Co. is known. It is possible to discern a necessary region and an unnecessary region in terms of strength by using the phase optimization software of this sort.

It is noted that while the structure of the guide barrel 15 serving as the inner barrel of the focus unit 4 has been exemplified above as the lens barrel component, the structure of the guide barrel 15 described above may be implemented to the cam barrel 14 serving as an outer periphery of the focus unit 4 for example. The structure of the focus unit 4 illustrated above is also applicable to a zoom unit for operating a zoom optical system, and the structure of the lens barrel component of the present embodiment may be implemented to a lens barrel component composing the zoom unit.

As described above, according to the present embodiment, it is possible to realize the small and light-weight lens barrel component that assures strength and wear resistance satisfying requirement specifications of the lens barrel component, combined with the required optical characteristics such as the light shielding property and antireflection characteristics of unwanted light. It is also possible to realize a small and light-weight lens unit combined with the optical characteristics satisfying requirement specifications and an optical instrument such as a digital or silver halide camera including such lens unit by using the lens barrel component of the present embodiment.

Illustrated below as second through fourth embodiments are an abutment portion that contacts to slide or engage with another member and that requires relatively higher strength and rigidity among the skeleton structural portion 31 of the lens barrel component, and a structure in which another skeleton portion is separated. It is noted that in the following second through fourth embodiments, the structure of the skeleton structural portion 31 that can be implemented to the same lens barrel whose basic structure is illustrated in FIG. 1 or 2 will be illustrated, and the same structure with the first embodiment described above will be used for members not illustrated in the following description of the entire structure. That is, the same or corresponding members or regions with those described above will be denoted by the same reference numerals, and their detailed description will be omitted unless specifically required.

Second Embodiment

Figure 9:
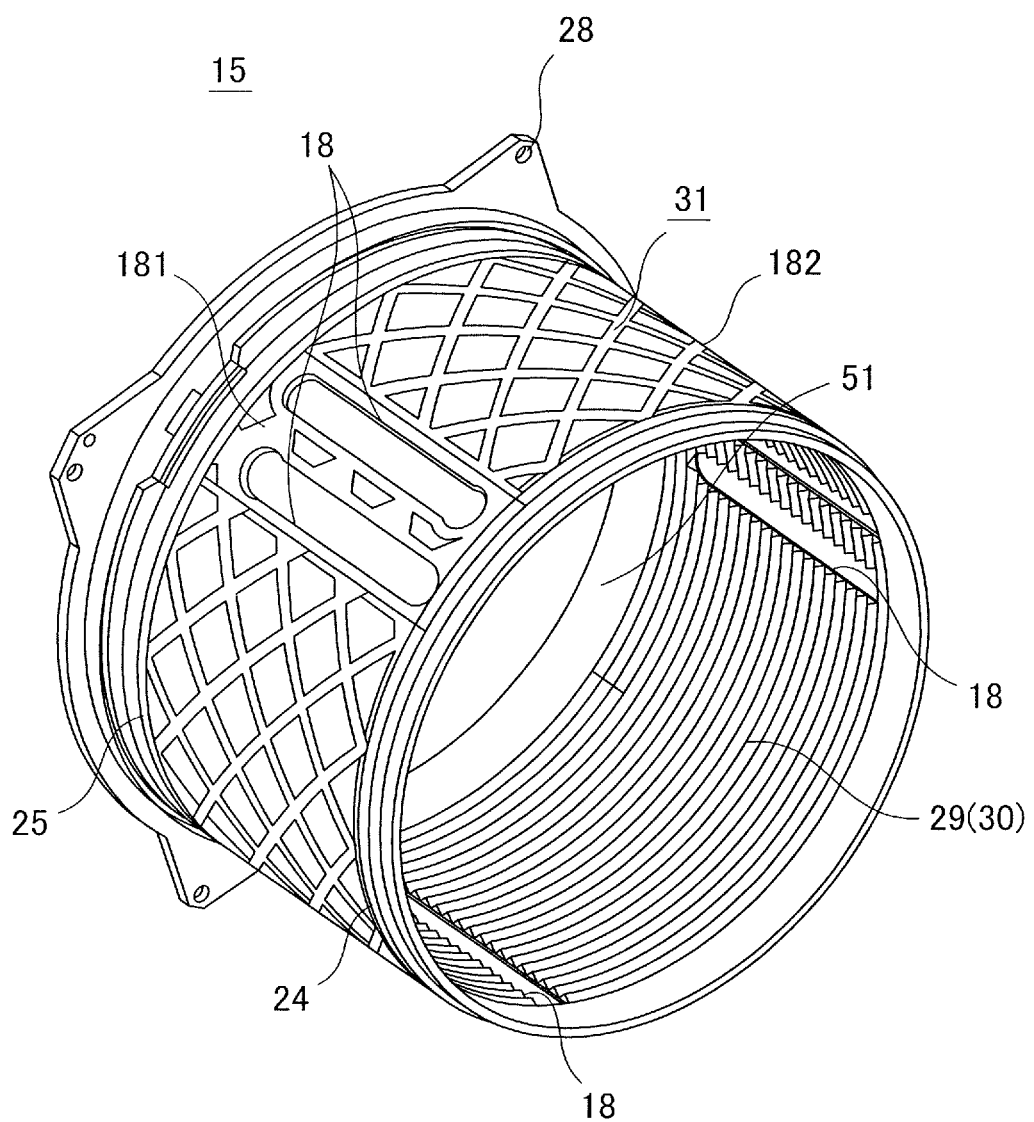
FIG. 9 is a perspective view of an appearance of a housing component or of a guide barrel in particular of the lens barrel of a second or third embodiment.
Figure 10:
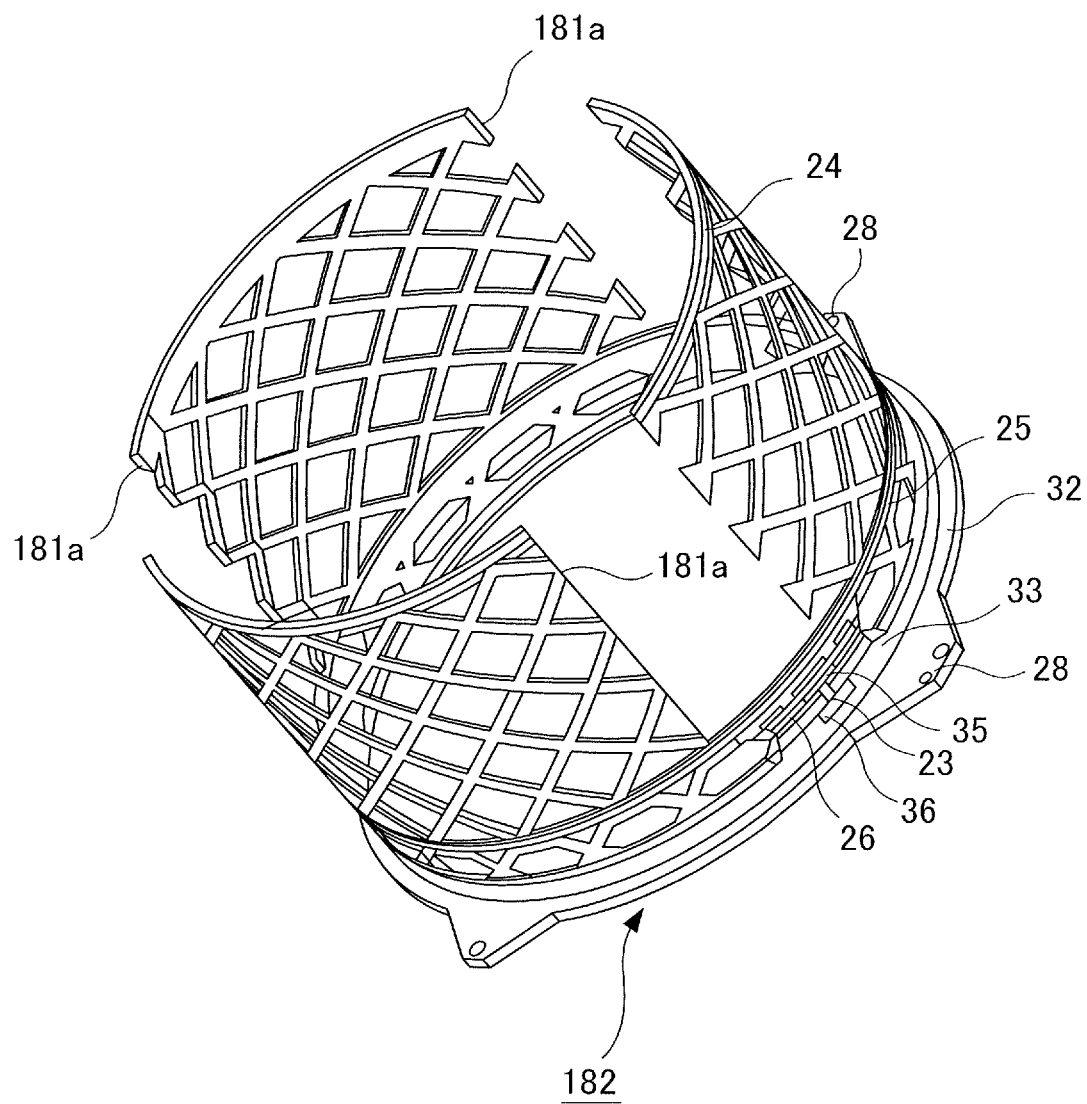
FIG. 10 is a perspective view of an appearance of a skeleton portion of the housing component or of the guide barrel in particular of the lens barrel of the second or third embodiment.
Figure 11:
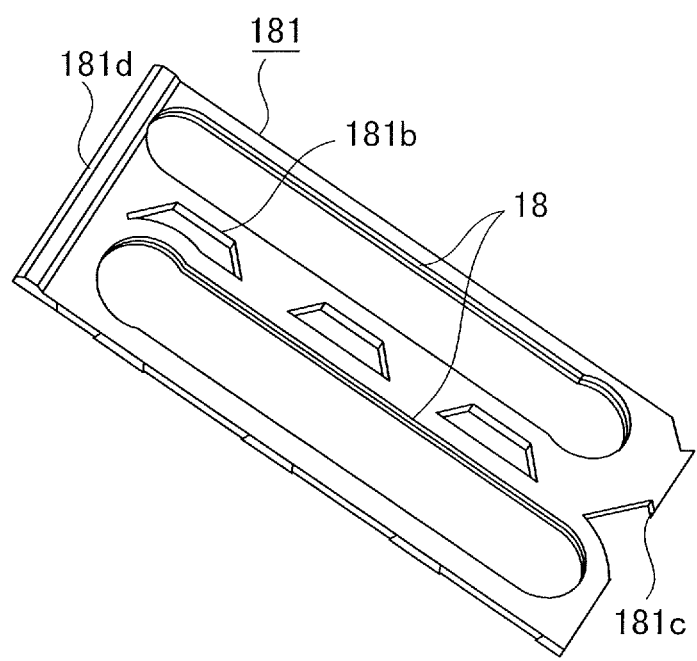
FIG. 11 is a perspective view of an appearance of the housing component or of a rectilinear cam plate serving as an abutment region of the guide barrel in particular of the lens barrel of the second or third embodiment.

FIG. 9 illustrates a guide barrel 15 which includes a skeleton structural portion 31 and which corresponds to a lens barrel component of a second embodiment, and FIG. 10 illustrates a skeleton portion 182 of the skeleton structural portion 31 in FIG. 9. FIG. 11 illustrates a rectilinear cam plate 181 that composes the skeleton structural portion 31 in FIG. 9 and serves as an abutment portion configured as a separate component from the skeleton portion 182 in FIG. 10.

Different first and second metal materials may be used for the rectilinear cam plate 181 serving as the abutment portion and for another member including the rectilinear cam 18 and for the skeleton portion 182 other than that by constructing the skeleton structural portion 31 separately. This arrangement makes it possible to apply different characteristics or physical properties to the abutment portion, i.e., the rectilinear cam plate 181, and the skeleton portion 182 other than the cam plate 181 that requires strength, rigidity, wear resistance or the like of each part of the skeleton structural portion 31. That is, it is possible to assure such characteristics as the strength, rigidity, wear resistance or the like fully at the abutment portion, i.e., the rectilinear cam plate 181, of the skeleton structural portion 31 and to lighten the skeleton portion 182 as necessary.

Two rectilinear cams 18 configured to engage or abut with the bearing 19 in FIG. 4 for example and to compose a part of the focus mechanism are provided in the rectilinear cam plate 181 in the second embodiment as illustrated in FIG. 11.

Meanwhile, the skeleton portion 182 composing the skeleton structural portion 31 as illustrated in FIG. 9 together with the rectilinear cam plate 181 is formed into a cylindrical member having a skeleton structure of lattice 151 on the cylindrical surface similarly to the skeleton structural portion 31 as illustrated in FIG. 5. The skeleton portion 182 may be formed by the methods using the 3D printer as described with reference to FIG. 6 or by casting and machining of the inner surface thereafter as described with reference to FIGS. 7A and 7B. Still further, the skeleton portion 182 includes cam plate storing portions 181a each formed into a cutaway structure for storing the rectilinear cam plate 181 at three places as illustrated in FIG. 10. Still further, similarly to the skeleton structural portion 31 as illustrated in FIG. 5, the skeleton portion 182 includes the sliding surfaces 24 and 25 configured to engage with the cam barrel 14, the screw fastening hole 23 into which the bearing 22 is screwed and the bearing surfaces 35 and 36. Further, these abutment and slide regions of the skeleton structural portion 31 exposed to the outer surface of the guide barrel 15 includes the bearing surface and the recess of the screw fastening portion 28 for connecting with a lens barrel component disposed out of the focus unit 4, the abutment surface 32 abutting with the washer spring 21, and the sliding surfaces 33 and 24 configured to engage with the charge barrel 20.

As described above, the rectilinear cam plate 181 as illustrated in FIG. 11 and the skeleton portion 182 as illustrated in FIG. 10 of the second embodiment are separate members and are combined with the optical characteristic portion 51 as illustrated in FIG. 9 by insert molding. The insert molding is carried out by injecting a resin material after setting the rectilinear cam plate 181 in FIG. 11 and the skeleton portion 182 in FIG. 10 at predetermined positions within a molding not illustrated for the insert molding through an appropriate positioning device not illustrated. The rectilinear cam plate 181 in FIG. 11 and the skeleton portion 182 in FIG. 10 are fixed at predetermined positions within the optical characteristic portion 51 by the insert molding.

It is noted that the rectilinear cam plate 181 may be provided with positioning portions such as a project portion 181c and a project line 181d for positioning the plate 181 within the mold or mutually positioning with the cam plate storing portion 181a of the skeleton portion 182 as illustrated in FIG. 11. Still further, the rectilinear cam plate 181 may be perforated or punched so as to have several openings 181b to lighten its weight. A manufacturing method of the rectilinear cam plate 181 is arbitrary, and the rectilinear cam plate 181 may be fabricated by pressing or by a 3D printer for example.

The antireflection surface 29 can be formed on the inner surface of the optical characteristic portion 51. The antireflection surface 29 may be also composed of the light shielding lines 30. Besides forming the antireflection surface 29 by the light shielding lines 30 by machining, the antireflection surface 29 may be formed separately by mat process or coating. Similarly to the guide barrel 15 as illustrated in FIG. 4 for example of the first embodiment, the abovementioned guide barrel 15 composed as illustrated in FIG. 9 can be disposed with the lens barrel of the optical component as a part of the lens barrel component, e.g., a long focal point and large interchangeable lens or fixed lens.

The first and second different metal materials may be used respectively for the rectilinear cam plate 181 serving as the abutment portion and for the skeleton portion 182 other than the rectilinear cam plate 181. FIG. 21 illustrates a table indicating a material, specific weight, cubic content, weight, and others of each part in the guide barrel 15 fabricated according to the second embodiment and according to the comparative example in a same format with the table of the first embodiment in FIG. 20.

In the example in FIG. 21, an aluminum alloy having a specific weight of 2.68 is used as the first metal material in order to be able to fully assure such characteristics as strength, rigidity, wear resistance and others for the rectilinear cam plate 181 of the skeleton structural portion 31. A magnesium alloy having a specific weight of 1.8 is used for the skeleton portion 182 other than the rectilinear cam plate 181 in order to mainly reduce the weight. The resin-made optical characteristic portion 51 may be formed of PC (polycarbonate) having a specific weight of 1.20. Meanwhile, a comparative example 1203 in FIG. 21 is an example in a case where portions having the same shape and equal cubic content with those of the skeleton structural portion 31 on the left side in the table in FIG. 21 and is equivalent to that indicated in FIG. 20 is fabricated only by the aluminum alloy.

Then, as indicated in FIG. 21, as compared to the structure of the comparative example 1203 having a total weight of 58.4 g, a total weight of the structure of the second embodiment is 29.7 g. Accordingly, the structure of the second embodiment achieves lightening of the total weight by about 49%. This lightening effect is even greater than the lightening effect of about 40% of the first embodiment indicated in FIG. 20 in which the aluminum alloy is applied to the whole skeleton structural portion 31. Thus, it is possible to expect the remarkable lightening effect by adopting the lighter magnesium alloy for the skeleton portion 182 that takes a large part of the skeleton structural portion 31 except of the rectilinear cam plate 181 made of the aluminum alloy.

Third Embodiment

One exemplary different configuration of the skeleton structural portion 31 constructed by the separate components of the second embodiment will be illustrated in a third embodiment. The components not illustrated below of the skeleton structural portion 31, the guide barrel 15 and the entire structure of the lens barrel component including those will be considered to be same with those described above.

Figure 12:
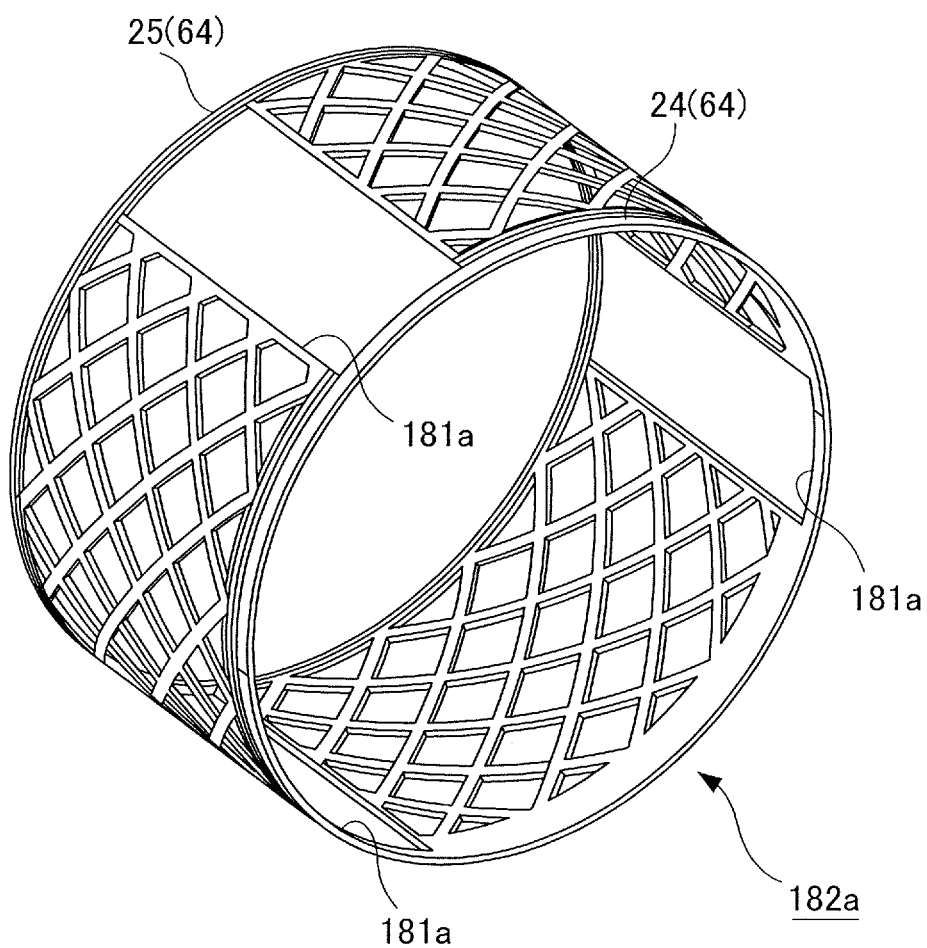
FIG. 12 is a perspective view of an appearance of the housing component of the lens barrel or a skeleton portion of a separate structure from a base unit of the guide barrel in particular of a fourth embodiment.

In the structure of the third embodiment, the skeleton structural portion 31 is composed of separate structures of the rectilinear cam plate 181 in FIG. 11, the skeleton portion 182 in FIG. 12 described above, and a base unit 183 illustrated in FIG. 13.

Figure 13:
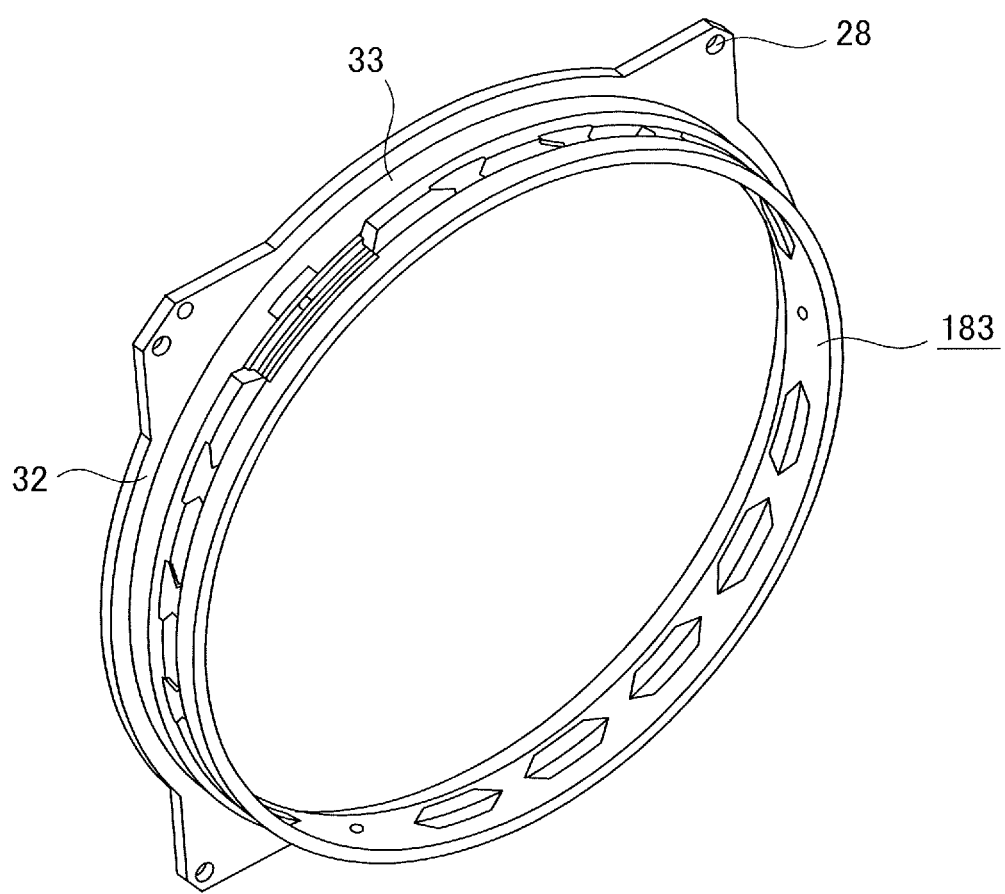
FIG. 13 is a perspective view of an appearance of the base unit used together with the skeleton portion illustrated in FIG. 12.

As illustrated in FIG. 13, the base unit 183 of the third embodiment is what the base portion of the skeleton portion 182 of the second embodiment in FIG. 10 is formed as a separate member. Therefore, the base unit 183 includes the bearing surface of the screw fastening portion 28 connected with a lens barrel component disposed out of the focus unit 4, the abutment surface 32 abutting with the washer spring 21 and others. The base unit 183 is briefly composed of a short cylindrical portion and a flange-like portion. Openings for reducing weight may be disposed in the short cylindrical portion. The rectilinear cam plate 181 in FIG. 11 is constructed in the same manner with that of the second embodiment described above.

The skeleton structural portion 31 is divided into the rectilinear cam plate 181 in FIG. 11 and the skeleton portion 182 in FIG. 12 whose structures are relatively simple, and the base unit 183 in FIG. 13 whose structure is relatively complicated by the separation of the components of the skeleton structural portion 31 as described above. There is a possibility that each of those components may be readily fabricated and production cost and time thereof may be reduced as a whole by adopting such a separate structure. For instance, according to the structure of the third embodiment, the base unit 183 whose structure is relatively complicated can be divided into a small shape as illustrated in FIG. 13. If the size and shape are small as illustrated in FIG. 13, there is a possibility that this portion can be readily manufactured at low cost even if the 3D printer is utilized.

Still further, because the base unit 183 whose structure is relatively complexed as illustrated in FIG. 13 is separated, the shape of the skeleton portion 182 is consolidated to a relatively simple shape as illustrated in FIG. 12. Therefore, there is a possibility that the skeleton portion 182a in FIG. 12 can be fabricated extremely simply at low cost by a method described later with reference to FIGS. 15 and 16 and that a manufacturing cost of the part of the guide barrel 15 can be lowered considerably as a whole.

The guide barrel 15 having an overall shape equivalent to one as illustrated in FIG. 9 for example can be fabricated by appropriately positioning the rectilinear cam plate 181 in FIG. 11, the skeleton portion 182 in FIG. 12 and the base unit 183 in FIG. 13 within the molding and injecting the resin material composing the optical characteristic portion 51 during the insert molding.

Here, FIG. 22 illustrates a table indicating a material, specific weight, cubic content, weight or the like of each part in the guide barrel 15 fabricated according to the third embodiment and according to the comparative example in a similar format with those of FIGS. 20 and 21. The skeleton structural portion 31 of the guide barrel 15 in FIG. 22 is what the rectilinear cam plate 181 in FIG. 11, the skeleton portion 182 in FIG. 12 and the base unit 183 in FIG. 13, i.e., the separate structures, is insert-molded with the optical characteristic portion 51.

As indicated in FIG. 22, the aluminum alloy having the specific weight of 2.68 is used as the first metal material for the rectilinear cam plate 181 in this case similarly to the case described above. Meanwhile, a lithium magnesium alloy having a specific weight of 1.36 which is even lighter than the magnesium alloy is used as a second metal material for the skeleton portion 182 and the base unit 183. The configuration of the comparative example 1203 is the same with those in FIGS. 20 and 21.

As indicated in FIG. 22, while a total weight of the structure of the comparative example 1203 is 58.42 g, a total weight of the structure of the third embodiment is 28.56 g, and the structure of the third embodiment achieves lightening by about 51%. This lightening effect is greater than the configuration in which the magnesium alloy having the specific weight of 1.8 is used entirely for the skeleton portion 182 of the second embodiment as indicated in FIG. 21. It is possible to expect a remarkable lightening effect by adopting the even lighter lithium magnesium alloy for the skeleton portion 182 and the base unit 183 which take a large part of the skeleton structural portion 31 except of the rectilinear cam plate 181 made of the aluminum alloy. This arrangement also makes it possible to readily fabricate the respective parts and to fabricate the skeleton structural portion 31 or the guide barrel 15, or the whole lens barrel at low cost by consolidating the skeleton portion 182 and the base unit 183 as the separate structures.

Fourth Embodiment

The skeleton portion 182 of the third embodiment as illustrated in FIG. 12 includes ringed sliding surfaces 24 and 25 at the periphery thereof. These portions compose abutment portions that slide with other members or that abut with the other members. Then, taking wear resistance and strength into consideration, these portions may be composed of the aluminum alloy, i.e., the first metal described above, and the other portions of the skeleton portion 182 in FIG. 12 may be composed of the light-weight lithium magnesium alloy or the magnesium alloy.

Figure 14:
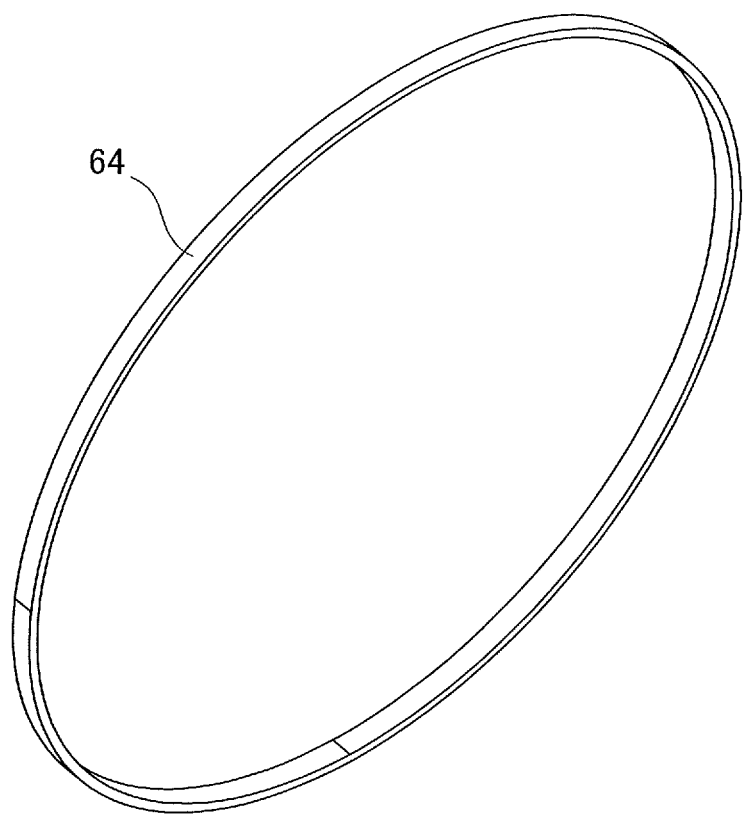
FIG. 14 is a perspective view of an appearance of a ring portion used together with the skeleton portion illustrated in FIG. 12.

FIG. 14 illustrates a ring portion 64 composed of the aluminum alloy, i.e., the first metal. The ring portion 64 is configured to have a same shape and size with the ringed sliding surface 24 disposed on an opposite side from an end portion where the base unit of the skeleton portion 182 in FIG. 12 is disposed. The ring portion 64 in FIG. 14 is insert-molded in the optical characteristic portion 51 in a condition in which the ring portion 64 is disposed at the same position with the sliding surface 24 in FIG. 12. In this case, no sliding surface integrated with 182 is provided. This arrangement makes it possible to configure a region equivalent to the sliding surface 24 described above by the ring portion 64. Or, the ring portion 64 may be used to construct the sliding surface 25 in the same manner. In such a case, no sliding surface 25 integrated with the skeleton portion 182 is provided.

Here, with the same formats with FIGS. 20 through 22, FIG. 23 illustrates a table indicating a material, specific weight, cubic content, weight and other of each part of the guide barrel 15 fabricated according to the fourth embodiment and according to the comparative example. The skeleton structural portion 31 of the guide barrel 15 in FIG. 23 is what the rectilinear cam plate 181 in FIG. 11, the skeleton portion 182 in FIG. 12, the base unit 183 in FIG. 13 and the ring portion 64, i.e., the separate structures, are insert-molded into the optical characteristic portion 51.

As indicated in FIG. 23, the aluminum alloy, i.e., the first metal material, having the specific weight of 2.68 is used for the rectilinear cam plate 181 serving as the abutment portion with another member and for the ring portion 64 in this example. Meanwhile, the lithium magnesium alloy having the specific weight of 1.36 and is even lighter than the magnesium alloy is used as the second metal material for the skeleton portion 182 and the base unit 183. However, in the table in FIG. 23, a cubic content of the skeleton portion 182 equivalent to the sliding surface 24 is reduced, and a cubic content of the aluminum alloy of the ring portion 64, i.e., the separate component, is increased. The configuration of the comparative example 1203 is the same with those of FIGS. 20 and 21.

As illustrated in FIG. 23, as compared to the structure of the comparative example 1203 having a total weight of 58.42 g, a total weight of the structure of the fourth embodiment is 29.02 g. Accordingly, the total weight is reduced by about 50% by the structure of the third embodiment. The lightening effect is reduced by about 1% as compared to the case of FIG. 22 because the cubic content of the aluminum alloy of the ring portion 64, i.e., the separate component, is increased. However, it is possible to obtain the lightening effect greater than the case of using the magnesium alloy having the specific weight of 1.8 is used for the entire skeleton portion 182 of the second embodiment in FIG. 21. The effect of manufacturing easiness is almost the same with that of the third embodiment.

Still further, according to the fourth embodiment, it is possible to apply enough strength, rigidity, wear resistance or the like not only to the rectilinear cam plate 181 but also to the region composing the abutment portion abutting with other members by composing the ring portion 64 functioning as the sliding surface 24 by the aluminum alloy.

Figure 15:
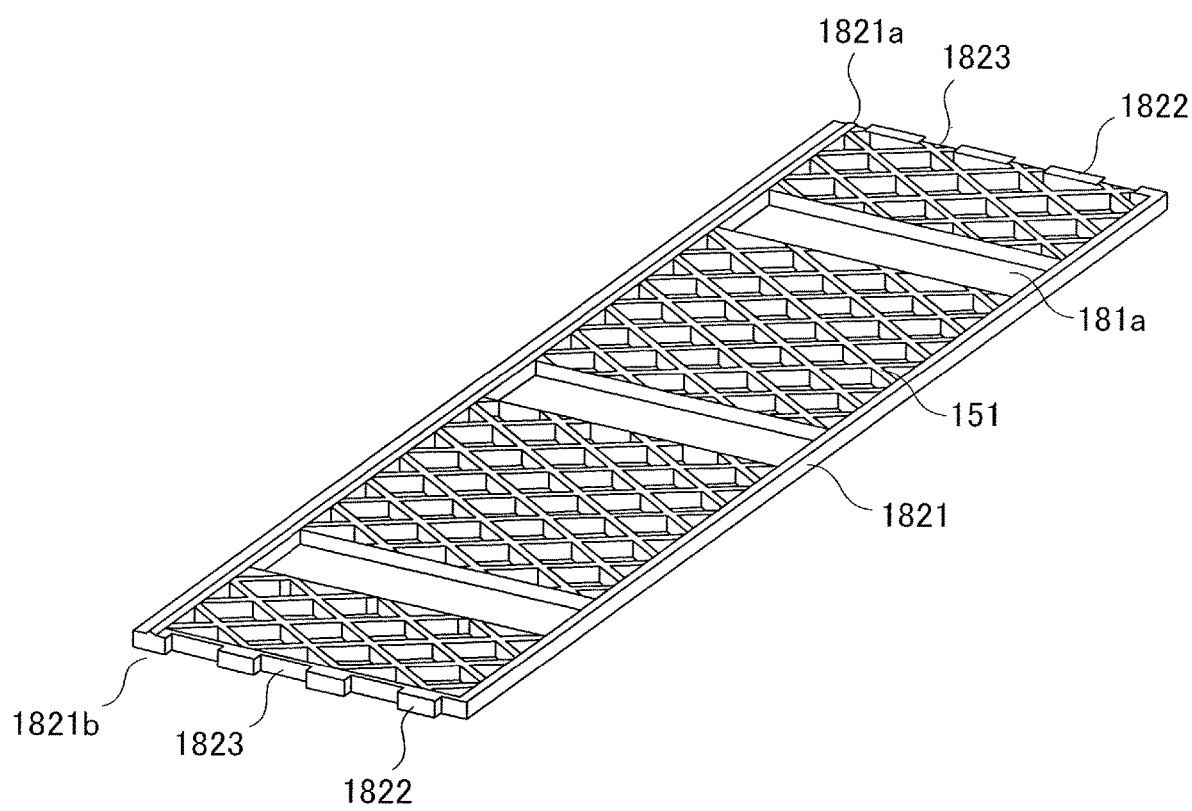
FIG. 15 is a perspective view of an appearance of the housing component of the lens barrel or of the skeleton portion of the guide barrel molded by pressing in particular used for example in the fourth embodiment.
Figure 16:
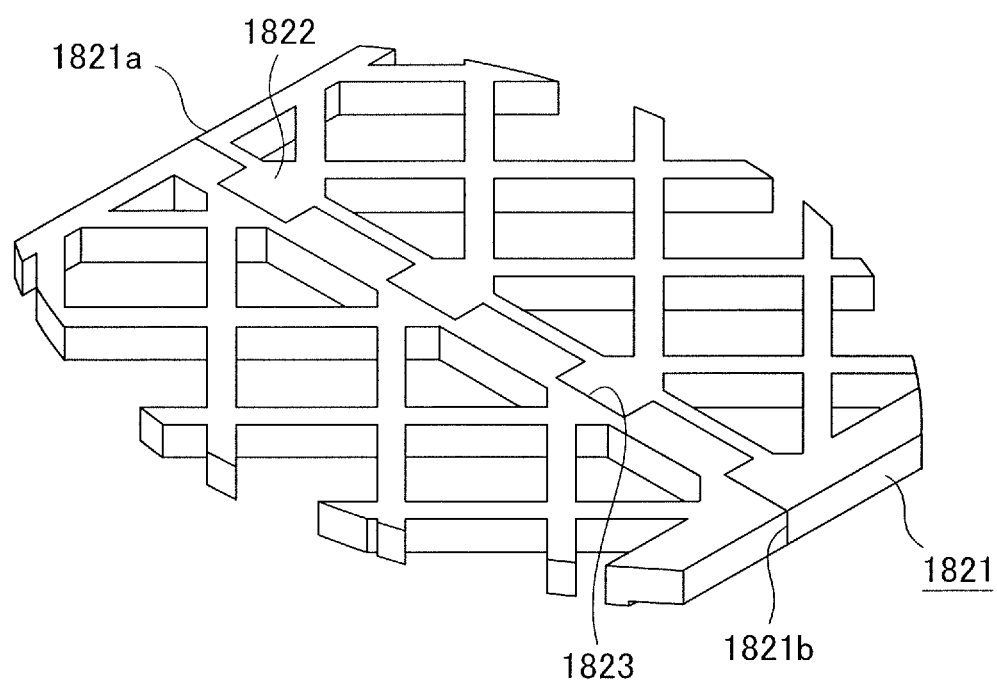
FIG. 16 is a perspective view of an appearance of a coupled structure of both end portions for forming the skeleton portion into a cylindrical shape from a state as illustrated in FIG. 15.

It is noted that the skeleton portion 182 in FIG. of the third and fourth embodiments can be fabricated into the cylindrical shape as illustrated in FIG. 12 by methods as illustrated in FIGS. 15 and 16. FIG. 15 illustrates a skeleton portion material 1821 by which the openings that compose the lattice 151 and cam plate storing portions 181a are formed on a plate-like metal material, e.g., the lithium magnesium alloy, having a predetermined thickness by such a method as press working or die casting. Besides the openings described above, the skeleton portion material 1821 is provided, at both end portions 1821a and 1821b thereof, with concavo-convex shapes of concave portions 1823 and convex portions 1822 that position the both end portions with each other when the skeleton portion material 1821 is formed into the cylindrical shape.

The skeleton portion material 1821 is rolled up to the cylindrical shape like the skeleton portion 182 as illustrated in FIG. 12, the concave and convex portions 1823 and 1822 of the both end portions 1821a and 1821b are engaged and are mutually fixed by such a method as adhesion and welding. Thereby, the skeleton portion 182 having the cylindrical shape as illustrated in FIG. 12 can be obtained. There is a possibility that the skeleton portion 182 of the third and fourth embodiments as illustrated in FIG. 12 can be fabricated relatively readily and at low cost by the methods as illustrated in FIGS. 15 and 16.

It is noted that the configuration in which the abutment portion abutting with another component and the skeleton portion of the skeleton structural portion except of the abutment portion of the skeleton structural portion are constructed separately has been described in the second through fourth embodiments. However, the present disclosure can be carried out if the abutment portion includes the region composed of the first metal material and the skeleton portion of the skeleton structural portion except of the abutment portion includes the region composed of the second metal material. That is, in the embodiments described above, it is not essential that the separate abutment portion and the skeleton portion of the skeleton structural portion are always composed of one type of metal material, respectively, and the separate skeleton structural portions may include a part of a material different from the first or second metal material for example. For instance, the first metal material composing the abutment surface abutting with another component of the abutment portion may be composed of a thin film of a metal material having high wear resistance, and the other part may be composed of a material different from the first metal material. The same applies also to the skeleton portion. That is, a metal material having strength and rigidity may be used as the second metal material for the region which requires strength and rigidity, and another part may be composed of a material different from the second metal material.

Fifth Embodiment

A mirror holder serving as an optical element holder will be described as one example of the optical component to which the present disclosure is applicable in a fifth embodiment.

Figure 17:
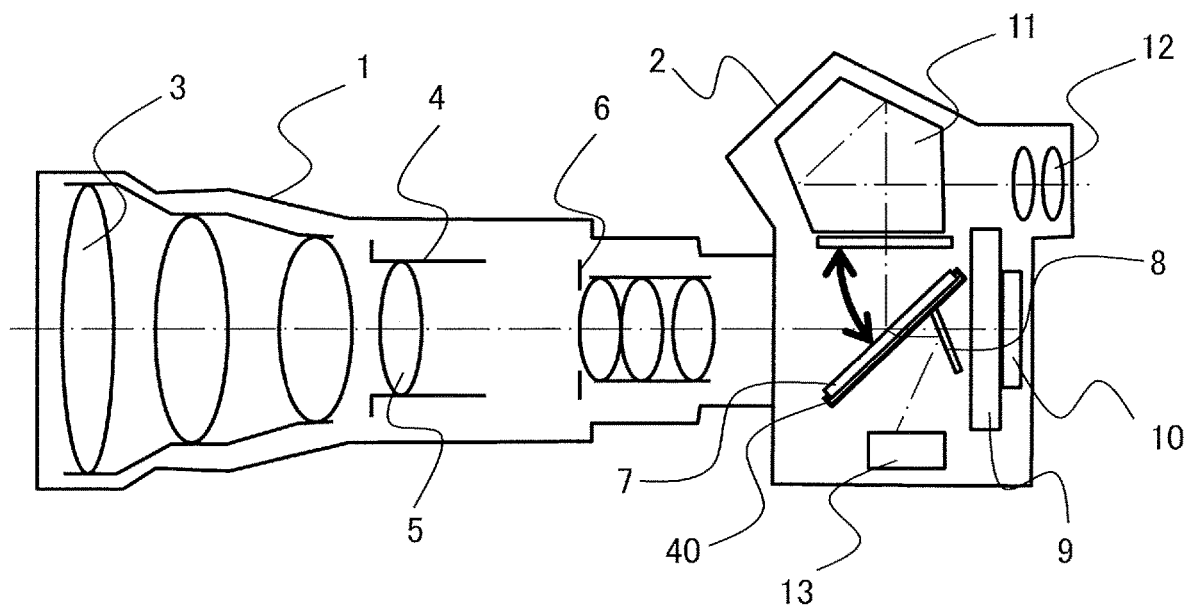
FIG. 17 illustrates a configuration of a camera of a fifth embodiment.

FIG. 17 illustrates a configuration of a single-lens reflex digital camera as an optical instrument for which the mirror holder of the present embodiment can be used. The photographing lens unit 1 is connected with the camera body 2. Light from an object is photographed through optical lenses such as the lens 3 included in the photographing lens unit 1. Before photographing, a photographing image is reflected by the main mirror 7, transmits through the prism 11, and is then imaged to a photographer through a finder lens 12.

The main mirror 7 is a half-mirror also in the present embodiment, and the light transmitted through the main mirror 7 is reflected by the sub-mirror 8 in the direction of the AF (auto-focus) unit 13. This reflected beam is used for focusing for example. During photographing, the main mirror 7 and the sub-mirror 8 are moved out of the optical path through the driving mechanism not illustrated, the shutter 9 is opened and the photographing image inputted from the photographing lens unit 1 is imaged on the image pickup element 10. The diaphragm 6 is configured such that brightness and a depth of focal point can be changed during photographing by changing an aperture area.

It is noted that there is a possibility that the image pickup element 10 of the single-lens reflex camera in FIG. 17 is replaced with a silver halide film. In such a case, the mirror holder of the present embodiment can be carried out by the same configuration as described later. Still further, while the photographing lens unit 1 may be fixedly attached to the camera body 2, the photographing lens unit 1 is often configured to be an interchangeable lens detachable from the body of the camera body 2 in the optical instrument of this sort similarly to the first through fourth embodiments described above.

The main mirror 7 is attached to and supported by a main mirror holder 40 by adhesion or the like. A swing position of the main mirror 7 and the main mirror holder 40 in FIG. 17 is an observation position for reflecting an observation light in the direction of the finder lens 12 which is different from that at the time of photographing. During photographing, the main mirror 7 and the main mirror holder 40 are swung to a horizontal position in FIG. 17 as indicated by arrows through the driving mechanism not illustrated in synchronism with opening of the shutter 9. At this time, the sub-mirror 8 is folded synchronously so as to be almost in flush with the main mirror holder 40.

The main mirror holder 40 is swung to move the main mirror 7 out of the photographing optical path and to shield an optical path between the finder lens 12 to prevent ghost otherwise caused by light entering from the outside through the finder lens 12. While the shutter 9 is closed after photographing, i.e., after making exposure required for the image pickup element 10, the main mirror 7 is returned quickly to the position illustrated in FIG. 17 to image, in synchronism with the closure of the shutter 9, the photographing image on the finder. Due to that, the main mirror 7 swung through the main mirror holder 40 is often called as a quick return mirror.

The unit of the main mirror holder 40 including the main mirror 7 and the sub-mirror 8 is desired to be lightened to improve such quick return driving characteristics as swing speed and restraint time. Meanwhile, there is a possibility that it is difficult to lighten the main mirror holder 40 by thinning boldly by the conventional configuration from aspects whether strength to an impact is kept during driving, whether the main mirror 7 is held steadily, and whether the light shielding property to unwanted light is kept before and after photographing.

Figure 18:
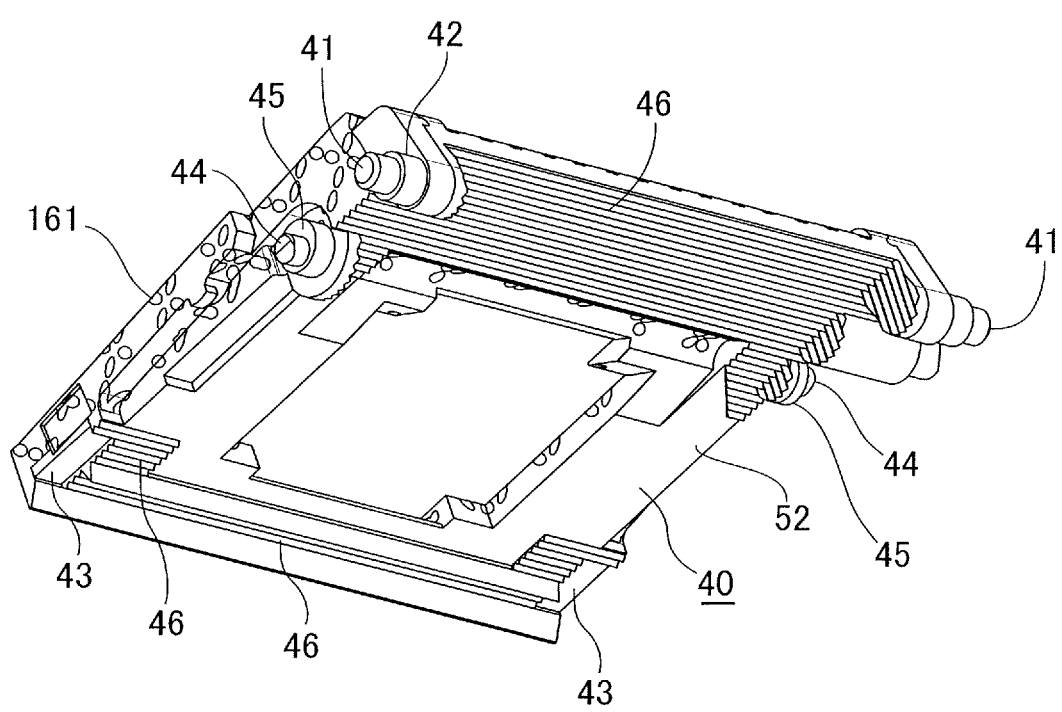
FIG. 18 is a perspective view of an appearance of a mirror holder used in the camera illustrated in FIG. 9.

FIG. 18 illustrates the main mirror holder 40 of the fifth embodiment. FIG. 18 is a perspective view of an under surface of the main mirror holder 40 viewed from a left rear side from which the sub-mirror 8 is taken out. The main mirror holder 40 has a composite structure of a skeleton structural portion 161 for keeping strength and rigidity and an optical characteristic portion 52 formed by insert-molding a resin material of black or the like to the skeleton structural portion 161 and having a light shielding property or antireflection characteristics. That is, the main mirror 7 and the sub-mirror 8 are supported by the optical element holder of the present embodiment, i.e., the structural body, formed by the skeleton structural portion 161 of the main mirror holder 40 combined with the optical characteristic portion 52. A solid shape of the main mirror holder 40 illustrated like a plain plate in FIG. is composed of the resin-made optical characteristic portion 52 except of parts specified below.

As illustrated in FIG. 18, the main mirror holder includes rotating shafts 41 and makes the swing drive described above around the rotational shafts 41. The main mirror holder 40 is provided, at a root of the rotational shafts 41, with receiving surfaces 42 that abut and slide with bearings not illustrated of the camera body 2 side to regulate a move of the main mirror holder 40 in a right-left direction in FIG. 18. The rotational shaft 41 and the receiving surface 42 composing the abutment portion or the sliding portion with those other parts are molded integrally with the skeleton structural portion 161 and are exposed out of the optical characteristic portion 52 made of resin.

The main mirror holder 40 keeps the attitude inserted into the main optical path of the camera while being inclined as illustrated in FIG. 17 except of the moment of driving the shutter as described above. At this time, the main mirror holder 40 comes into contact with a positioning member not illustrated of the camera body 2 at a tip of a rear surface of the main mirror holder 40. A receiving surface 43 composing an abutment portion or a sliding portion with the other parts is formed integrally with the skeleton structural portion 161 and is exposed out of the optical characteristic portion 52 made of resin.

It is also necessary to recede the sub-mirror 8 from the main optical path such that it takes a horizontal attitude in FIG. 17 similarly to the main mirror 7. To that end, the main mirror holder 40 is provided with rotating shafts 44 for swinging the sub-mirror 8 such that the sub-mirror 8 takes the attitude in parallel with the main mirror 7, and receiving surfaces 45 configured to abut and slide with a holder not illustrated for holding the sub-mirror 8 are disposed at the root of the rotational shafts 44. The receiving surfaces 45 composing the abutment portion or the sliding portion with the other parts are molded integrally with the skeleton structural portion 161 and are exposed out of the optical characteristic portion 52 made of resin.

It is also necessary to prevent ghost and flare from being generated by light reflected by the rear surface portion when the main mirror holder 40 moves out of the optical path. To that end, an antireflection surface composed of light shielding lines is formed at a necessary region of the rear surface of the main mirror holder 40. The antireflection surface composed of the light shielding lines 46 in FIG. 18 can be formed by simultaneous molding during the insert molding of the optical characteristic portion 52. Still further, the region of the antireflection surface composed of the light shielding lines 46 may be formed by a post-processing such as matting and coating. It is noted that the similar antireflection surface may be formed by coating for example also on the receiving surfaces 43 that take the attitude facing the main optical axis direction when the main mirror holder 40 is moved to the horizontal position as illustrated in FIG. 17 at the time of photographing.

The skeleton structural portion 161 for keeping strength and rigidity is composed of metal similarly to the first through fourth embodiments described above also in the main mirror holder 40 serving as the optical component of the fifth embodiment. However, as illustrated in FIG. 18, the most of the skeleton structural portion 161 other than the region composing the abutting and sliding portion described above is embedded within and covered by the surface of the resin of the optical characteristic portion 52 and is invisible in appearance. In FIG. 18, the region of the skeleton structural portion 161 other than the region composing the abutting and sliding portion is exposed almost only to an edge portion of the main mirror holder 40 and the region other than that is embedded within the optical characteristic portion 52.

Figure 19:
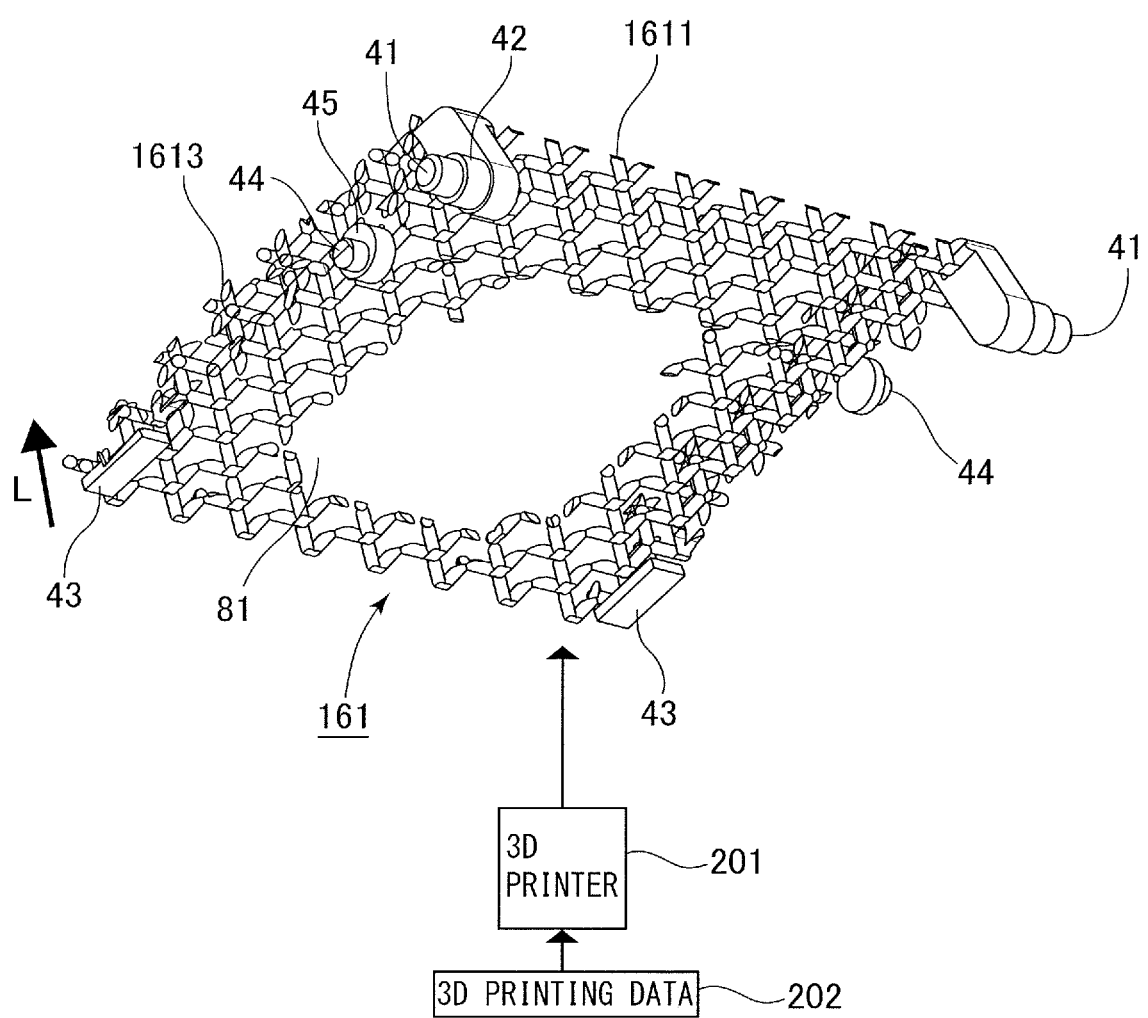
FIG. 19 is a perspective view of an appearance of a metal portion composing a skeleton of the mirror holder in FIG. 10.

FIG. 19 illustrates an exemplary configuration of the skeleton structural portion 161 of the main mirror holder 40 before the resin of the optical characteristic portion 52 is inserted. Similarly to the main mirror holder 40 in FIG. 18, FIG. 19 illustrates an under surface of the skeleton structural portion 161 from the rear left side.

While the skeleton structural portion 161 of the main mirror holder 40 of the present embodiment has a grid-like shape similarly to the first through fourth embodiments, the skeleton structural portion 161 of the present embodiment is formed into a cubic grid structure as illustrated in FIG. 19 to obtain a certain degree of thickness as skeleton of the main mirror holder 40 in the present embodiment. This type of cubit grid structure is often called also as a 'lattice structure'. This cubic grid structure has a shape in which a large number of separate inclined grids is disposed at predetermined intervals and is combined. The regions 41, 42, 43, 44, 45 and the like composing the abovementioned abutting and sliding portions of the skeleton structural portion 161 are shaped in the same shapes with those in FIG. 18. A center region of the skeleton structural portion 161 is an open portion 81 through which the light advancing in the direction of the sub-mirror 8 through the main mirror 7 of the half mirror is passed.

The skeleton structural portion 161 in FIG. 19 is lightened by the openings partitioned by the regular arrangement of the inclined grids 1611 in the cubic grid structure. Therefore, it is possible to lighten the skeleton structural portion 161 considerably. The cubic grid structure or the lattice structure of the shape as illustrated in FIG. 19 can be suitably shaped by the 3D printer 201 in particular.

That is, the skeleton structural portion 161 in FIG. 19 can be shaped by supplying 3D printing data 202 to the 3D printer 201 similarly as described above. In such a case, a lamination direction L in which lamination shaping is repeated is taken in a direction of the thickness of the skeleton structural portion 161. In this case, it is preferable to form the inclined grid 1611 or 1613 of the skeleton structural portion 161 such that an inclination angle inclined with respect to a straight line, i.e., a normal line, perpendicular to a plane in which one layer of 3D shaped layer is included is 50° or less by the same reason with the case of the grid 1512 described above. The plane which is a standard of the inclination angle and in which one layer of 3D shaped layer is included may be the receiving surface 43 for example. It is noted that a case considered here is a case where the plane in which one layer of the 3D shaped layer is included is approximately in parallel with one surface, e.g., the receiving surface 43 and the rear surface in which the light shielding lines 46 are provided in FIG. 18, of the structural body composed by the skeleton structural portion 161 combined with the optical characteristic portion 52 made of resin afterward.

It is noted that a manufacturing method that realizes a required precision can be adopted by implementing a secondary process, i.e., the post-processing, by machining after insert molding for regions for which it is hard to assure the precision by the 3D printer, casting or the insert molding in manufacturing the main mirror holder 40. In such a case, it is desirable to add an extra thickness to the regions to which the secondary processing, i.e., the post-processing, is to be implemented in implementing the 3D printer, casting or the insert molding.

The structure in which the metallic skeleton structural portion 161 is exposed out of the resin-made optical characteristic portion 52 on the side surface portion of the main mirror holder 40 has been exemplified above. However, there is a possibility that light reflects at the region of the skeleton structural portion 161 exposed out of the optical characteristic portion 52, thus generating ghost and flare. In such a case, the exposed region of the skeleton structural portion 161 may be colored by coating or by an alumite treatment to apply antireflection characteristics to the exposed portion of the skeleton structural portion 161 as necessary.

It is noted that the shape of the openings, i.e., the lightening portions, regularly disposed in the skeleton structural portion 161 may be determined by using phase optimization analysis or the like similarly to the embodiments described above also in the skeleton structural portion 161 of the main mirror holder 40 of the present embodiment.

The skeleton structural portion 161 made of metal in the optical component of the fifth embodiment, i.e., the main mirror holder 40, may be formed of the magnesium alloy having a specific weight of 1.81 as indicated the table in FIG. 24. The optical characteristic portion 52 made of resin is molded by foaming ABS (acrylonitrile butadiene styrene) having a specific weight of 1.20 with an expansion ratio of 10%. The specific weight after insert molding is 1.08. As indicated in the table in FIG. 24, a cubic content of the skeleton structural portion 161, i.e., the metal portion, is 0.34 cm^3, and its weight is 0.62 g. A cubic content of the optical characteristic portion 52, i.e., the resin portion, is 0.55 cm^3, and its weight is 0.59 g. A total weight in which the weights of the metal and resin portions are added is 1.21 g.

Meanwhile, a comparative example 1204 is a case where components having a cubic content equal to that of the skeleton structural portion 161, i.e., the metal portion, and the optical characteristic portion 52, i.e., the resin portion, on the left side of the table, i.e., of the fifth embodiment, is fabricated only by the magnesium alloy. A total weight of the comparative example 1204 is 1.60 g, so that lightening of the total weight of about 25% can be achieved by the structure of the fifth embodiment.

As described above, according to the present embodiment, it is possible to realize the small and light-weight optical element holder or the main mirror holder in particular that assures strength and wear resistance satisfying requirement specifications combined with the required optical characteristics such as the light shielding property and antireflection characteristics of unwanted light. It is also possible to realize an optical instrument such as a high performance digital or silver halide camera by using the optical element holder of the present embodiment.

It is noted that the structure in which the abutment portion of the skeleton structural portion abutting with another member and the skeleton portion of the skeleton structural portion except of the abutment portion are separate members or the structure composed of the different first and second metal materials as described in the first through fourth embodiments are applicable also to the mirror holder of the fifth embodiment. For instance, among the skeleton structural portion 161 of the main mirror holder 40, the abutment portions such as the rotational shafts 41 and 44 and the receiving surfaces 42, and 45 that slide or abut with other members are composed of the first metal material. Then, the other regions different from them are composed of the second metal material. In such a case, similarly to what described above, the aluminum alloy is used as the first metal material, and the magnesium alloy or lithium magnesium alloy is used as the second metal material for example. It is possible to provide the main mirror holder having well-balanced favorable characteristics in terms of lightening, rigidity, strength and durability by selecting such structure and metal material appropriately.

Sixth Embodiment

In the sixth embodiment, a plurality of minute anchor-shaped portions are provided on a surface of the skeleton structural portion that contacts with the optical characteristic portion during the insert molding, for firmly combining the skeleton structural portion and the optical characteristic portion by an anchoring effect. The present embodiment is suitable for a particular case that a separation of the optical characteristic portion from the skeleton structural portion after insert molding is concerned, e.g., a case of using a resin having a high shrinkage rate as an optical characteristic portion or a case of forming a thinner optical characteristic portion.

FIGS. 25A through 25D illustrate a housing component of the lens barrel of the sixth embodiment with which the anchor-shaped portions 63 are formed, in particular, a sectional structure of the skeleton structural portion 31. More specifically, FIG. 25A illustrates a section view of the guide barrel 15 as the housing component of the lens barrel, FIG. 25B illustrates an enlarged section view of a part of FIG. 24A, FIG. 25C illustrates an enlarged section view of a part of FIG. 24B, and FIG. 25D illustrates a right side view of FIG. 25C.

As shown in FIGS. 25A through 25D, the plurality of minute anchor-shaped portions 63 are provided on the surface 31a, which contacts with the optical characteristic portion 51, of the skeleton structural portion 31. Each minute anchor-shaped portion 63 is a minute concave portion formed on the surface 31a of the skeleton structural portion 31 such that a width (dimension) X of an entrance portion 63a is larger than a width Y of a bottom portion 63b (deep side portion) in FIG. 25C. That is, the minute anchor-shaped portion 63 is configured such that a size of an inner space S of the anchor-shaped portion 63 is wider than that of the entrance portion 63a. With this configuration, the resin to be the optical characteristic portion 51 flows into the inner spaces S of the minute anchor-shaped portions 63 and is harden within the anchor-shaped portions 63. Thus, the separation or cracking of the optical characteristic portion 51 is prevented.

Meanwhile, because the skeleton structural portion 31 has the plurality of minute anchor-shaped portions 63, additive manufacturing methods using 3D printers are suitable for manufacturing the skeleton structural portion 31. In a case where lamination shaping is repeated along the lamination direction L as illustrated in FIG. 25A for manufacturing the skeleton structural portion 31, the width X of the entrance portion 63a is preferably set to be a double or more of a one-layer thickness of the lamination shaping. In the present embodiment, the width X of the entrance portion 63a is set within a range from 0.02 mm to 0.3 mm. If the size of the entrance portion 63a is smaller than that range, the hole of the entrance portion 63a may be blocked. Also, if the size of the entrance portion 63a is larger than that range, due to increase of the thickness, sink marks and/or voids may be generated on the optical characteristic portion 51.

To form the minute anchor-shaped portion 63 such a shape, it is possible to set the thickness of the resin at the entrance portion 63a as thin as 0.02 mm, which is the minimum thickness that can secure fluidity of resin in most cases. The width Y of the bottom portion 63b should be larger than the width X of the entrance portion 63a for forming the anchor shape on the surface 31a of the skeleton structural portion 31. For example, the width X of the entrance portion 63a is set to be 0.02 mm, and the width Y of the bottom portion 63b is set to be 0.08 mm.

Because the inner space S of the minute anchor-shaped portion 63 will be filled with a powder material just after shaping of the skeleton structural portion 31 is done, a removal of the powder material is executed after shaping or after a secondary processing. Any means capable of removing the powder material such as sucking by a vacuum cleaner, blowing by an air gun, and ultrasonic washing may be employed.

As described above, the present embodiment makes it possible to firmly combine the skeleton structural portion and the optical characteristic portion 51. Since this feature improve a degree of freedom in designing manufacturing process (e.g., choosing resin materials, setting a thickness of a resin, and so on), the manufactured optical components can be made further lightened.

It is noted that the shape of the anchor-shaped portion is not limited to the present embodiment and any shape capable of firmly combining the skeleton structural portion and the optical characteristic portion by an anchor effect may be employed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-252136, filed Dec. 26, 2016, Japanese Patent Application No. 2017-105087, filed May 26, 2017, and Japanese Patent Application No. 2017-241156, filed Dec. 15, 2017, which are hereby incorporated by reference wherein in their entirety.

What is claimed is:

1. A lens barrel, comprising:
an optical element;
a skeleton structural portion; and an optical characteristic portion comprising a resin material having a light shielding property and combined with the skeleton structural portion to form a structural body, wherein the skeleton structural portion is made of a metal material, has a cylindrical shape, and includes a plurality of grids formed of the metal material and disposed so as to incline with respect to a straight line in parallel with an axial center line of a cylindrical surface formed by the skeleton structural portion.

2. The lens barrel according to claim 1, wherein an inclination angle of each grid inclined with respect to the straight line in parallel with the axial center line of the cylindrical surface is 50° or less.

3. The lens barrel according to claim 1, wherein the skeleton structural portion is made of a material having higher rigidity than that of the resin material of the optical characteristic portion, and a part of the skeleton structural portion is exposed to a surface of the structural body and is used as an abutment or coupling portion with another component.

4. The lens barrel according to claim 1, wherein the resin material of the optical characteristic portion is fitted with an opening of the skeleton structural portion and is exposed on a surface of the structural body.

5. The lens barrel according to claim 1, wherein the lens barrel includes an antireflection surface on an inner surface of the optical characteristic portion.

6. The lens barrel according to claim 1, wherein the skeleton structural portion includes an abutment portion abutting with another member and a skeleton portion excluding the abutment portion, the abutment portion including a region composed of a first metal material, and the skeleton portion being composed of a second metal material.

7. The lens barrel according to claim 6, wherein the abutment portion and the skeleton portion are separate members and the structural body and the skeleton portion are combined by the optical characteristic portion.

8. The lens barrel according to claim 6, wherein the first metal material is aluminum alloy.

9. The lens barrel according to claim 6, wherein the second metal material is magnesium alloy.

10. The lens barrel according to claim 9, wherein the second metal material is lithium magnesium alloy.

11. An optical element holder comprising:
a skeleton structural portion defining a plurality of regularly partitioned openings;
an optical characteristic portion comprising a resin material having a light shielding property and combined with the skeleton structural portion to form a structural body,
wherein the structural body comprises a grid disposed so as to incline with respect to one surface of the structural body.

12. The optical element holder according to claim 11, wherein an angle of the inclination of the grid with respect to a straight line perpendicular to the one surface of the structural body is 50° or less.

13. The optical element holder according to claim 11, wherein the skeleton structural portion is made of a material having higher rigidity than that of the resin material of the optical characteristic portion, and a part of the skeleton structural portion is exposed to a surface of the structural body and is used as an abutment portion or a coupling portion with another component.

14. The optical element holder according to claim 11, wherein a three-dimensional grid structure of the skeleton structural portion formed of a metal material is embedded in the structural body.

15. The optical element holder according to claim 11, wherein the optical element holder includes antireflection characteristics on an inner surface of the optical characteristic portion.

16. The optical element holder according to claim 11, wherein a mirror is supported by the structural body.

17. An optical instrument comprising:
an optical element; and
the optical element holder according to claim 11, the optical element holder supporting the optical element.

18. A lens barrel, comprising:
an optical element;
a skeleton structural portion comprising an abutment portion abutting with another member; and
a resin portion made of a resin material having a light shielding property and combined with the skeleton structural portion to form a structural body,
wherein the skeleton structural portion includes a plurality of grids each of which is formed of a metal material and has a triangular shape or a quadrangular shape.

19. The lens barrel according to claim 18, wherein the skeleton structural portion contains magnesium alloy.

20. The lens barrel according to claim 19, wherein the magnesium alloy is lithium magnesium alloy.

21. An optical element holder, comprising:
a skeleton structural portion comprising an abutment portion abutting with another member; and
a resin portion made of a resin material having a light shielding property and combined with the skeleton structural portion to form a structural body,
wherein the skeleton structural portion includes a plurality of grids each of which is formed of a metal material and has a triangular shape or a quadrangular shape.

22. An optical instrument comprising:
an optical element; and
the optical element holder according to claim 21, the optical element holder supporting the optical element.

23. The optical element holder according to claim 21, wherein the skeleton structural portion contains magnesium alloy.

24. The optical element holder according to claim 23, wherein the magnesium alloy is lithium magnesium alloy.

* * * * *